(12) United States Patent
Love, III et al.

(10) Patent No.: US 11,771,253 B2
(45) Date of Patent: Oct. 3, 2023

(54) INSTALLATION OF MULTI-COMPONENT FLOOR MAT

(71) Applicant: Milliken & Company, Spartanburg, SC (US)

(72) Inventors: Franklin S. Love, III, Columbus, NC (US); Sudhanshu Srivastava, Greer, SC (US); Venkatkrishna Raghavendran, Houston, TX (US); Brandon T. Roberts, Greer, SC (US); Padmakumar Puthillath, Greer, SC (US); Dale S. Kitchen, Boiling Springs, SC (US); Ty G. Dawson, Spartanburg, SC (US); Xin Li, Boiling Springs, SC (US); Christopher A. DeSoiza, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 67 days.

(21) Appl. No.: 17/320,294

(22) Filed: May 14, 2021

(65) Prior Publication Data

US 2021/0324576 A1    Oct. 21, 2021

Related U.S. Application Data

(60) Division of application No. 16/109,910, filed on Aug. 23, 2018, which is a continuation of application No. 15/212,361, filed on Jul. 18, 2016.
(Continued)

(51) Int. Cl.
*D06N 7/00* (2006.01)
*A47L 23/26* (2006.01)
(Continued)

(52) U.S. Cl.
CPC ......... *A47G 27/0406* (2013.01); *A47G 27/02* (2013.01); *A47G 27/0206* (2013.01);
(Continued)

(58) Field of Classification Search
CPC ............... A47G 27/02; A47G 27/0206; A47G 27/0406; D06N 7/0068; D06N 7/0071;
(Continued)

(56) References Cited

U.S. PATENT DOCUMENTS 2,693,654 A    11/1954    Clark
3,126,924 A     3/1964    Kirkpatrick
(Continued)

FOREIGN PATENT DOCUMENTS

AU    198941219    3/1991
AU       682899    10/1997
(Continued)

OTHER PUBLICATIONS

Brainiac75, YouTube video "Spacer or No Spacer," https://youtu.be/9Q8qqUsNf-U, May 9, 2012.*
(Continued)

*Primary Examiner* — Cheryl Juska
(74) *Attorney, Agent, or Firm* — Brenda D. Wentz

(57) ABSTRACT

This invention relates to installation methods for a multi-component floor mat. The floor mat typically contains a textile component and a base component. Alignment and deployment of the textile component with the base component in an efficient manner is described herein.

4 Claims, 22 Drawing Sheets

Related U.S. Application Data

(60) Provisional application No. 62/201,149, filed on Aug. 5, 2015.

(51) Int. Cl.
  *A47G 27/02* (2006.01)
  *A47G 27/04* (2006.01)
  *B32B 7/06* (2019.01)
  *B32B 7/025* (2019.01)

(52) U.S. Cl.
  CPC ............ *A47L 23/266* (2013.01); *B32B 7/025* (2019.01); *B32B 7/06* (2013.01); *D06N 7/0071* (2013.01); *B32B 2307/208* (2013.01); *D06N 2209/045* (2013.01); *D06N 2211/066* (2013.01); *D06N 2213/068* (2013.01); *Y10T 428/23979* (2015.04)

(58) Field of Classification Search
  CPC ............ D06N 7/0065; D06N 2213/06; D06N 2213/068; D06N 2205/20; D06N 2209/04; D06N 2209/045; D06N 2211/066; B29L 2031/7324; B32B 2471/04; B32B 7/00; B32B 7/025; B32B 7/04; B32B 7/06; B32B 25/00; B32B 25/02; B32B 25/10; B32B 2038/0076; B32B 2264/1056; B32B 2037/208; Y10T 428/23979
  See application file for complete search history.

(56) References Cited

U.S. PATENT DOCUMENTS

| | | | |
|---|---|---|---|
| 4,070,505 A | 1/1978 | Baril, Jr. | |
| 4,187,332 A | 2/1980 | Fouche, Jr. | |
| 4,361,925 A | 12/1982 | Yamamoto | |
| 4,397,900 A | 8/1983 | Higgins | |
| 4,405,674 A | 9/1983 | Kyle | |
| 4,515,850 A | 5/1985 | Ishino | |
| 4,716,065 A | 12/1987 | McLaughlin | |
| 5,035,017 A | 7/1991 | Komuro | |
| 5,077,870 A | 1/1992 | Melbye | |
| 5,161,272 A | 11/1992 | Yamaguchi | |
| 5,198,278 A | 3/1993 | Sumimoto | |
| 5,305,565 A | 4/1994 | Nagahama | |
| 5,524,317 A | 6/1996 | Nagahama | |
| 5,752,357 A | 5/1998 | Piller | |
| 5,811,165 A | 9/1998 | Andreen | |
| 5,902,662 A | 5/1999 | Kerr | |
| 6,022,619 A | 2/2000 | Kuhn | |
| 6,083,596 A * | 7/2000 | Pacione | ............... A47G 27/045 156/304.3 |
| 6,114,014 A | 9/2000 | Ikeda | |
| 6,156,424 A | 12/2000 | Taylor | |
| 6,159,576 A | 12/2000 | Rockwell | |
| 6,219,876 B1 | 4/2001 | Blum | |
| 6,233,776 B1 | 5/2001 | Blum | |
| 6,250,001 B1 | 6/2001 | Gillespie | |
| 6,549,502 B1 | 4/2003 | Lagasse | |
| 6,787,215 B1 | 9/2004 | Burke, III | |
| 6,821,573 B1 | 11/2004 | Paping | |
| 6,881,450 B1 | 4/2005 | Texier | |
| 6,913,810 B2 | 7/2005 | Wang | |
| 7,001,645 B1 | 2/2006 | Texier | |
| 7,022,394 B2 | 4/2006 | Fujisawa | |
| 7,125,595 B2 | 10/2006 | Kobayashi | |
| 7,504,131 B2 | 3/2009 | Deleon | |
| 7,648,751 B2 | 1/2010 | Janzen | |
| 7,854,021 B2 | 12/2010 | Compton | |
| 8,046,160 B2 | 10/2011 | Carter | |
| 8,056,295 B2 | 11/2011 | Cappelle | |
| 8,298,642 B2 | 10/2012 | Yuan | |
| 8,309,198 B2 | 11/2012 | Bell | |
| 8,656,682 B2 | 2/2014 | Williamson | |
| 8,760,839 B1 | 6/2014 | Mathis | |
| 9,028,951 B2 | 5/2015 | Boudouris | |
| 2002/0028313 A1 | 3/2002 | Blum | |
| 2002/0045021 A1 | 4/2002 | Brown | |
| 2003/0072911 A1* | 4/2003 | Higgins | ............. A47G 27/0293 428/95 |
| 2003/0129354 A1 | 7/2003 | Burke | |
| 2003/0180499 A1 | 9/2003 | Kobayashi | |
| 2004/0013849 A1 | 1/2004 | Kobayashi | |
| 2004/0053002 A1 | 3/2004 | Kobayashi | |
| 2005/0064242 A1 | 3/2005 | Schneider | |
| 2006/0147892 A1 | 7/2006 | Moore | |
| 2007/0275207 A1 | 11/2007 | Higgins | |
| 2008/0152902 A1 | 6/2008 | Adler | |
| 2008/0190042 A1 | 8/2008 | Williamson | |
| 2008/0263922 A1 | 10/2008 | Ho | |
| 2009/0191401 A1 | 7/2009 | Deetz | |
| 2009/0304985 A1 | 12/2009 | Yuan | |
| 2010/0247841 A1* | 9/2010 | Bell | ................... A47G 27/0225 428/89 |
| 2011/0054074 A1 | 3/2011 | Jonschker | |
| 2011/0123758 A1 | 5/2011 | Pollaud | |
| 2011/0195219 A1* | 8/2011 | Bell | ................... A47G 27/0225 428/88 |
| 2011/0201241 A1 | 8/2011 | Rubino | |
| 2012/0000156 A1 | 1/2012 | Esposito | |
| 2012/0019022 A1 | 1/2012 | Cianci | |
| 2013/0040097 A1* | 2/2013 | Bell | ................... A47G 27/0412 428/100 |
| 2013/0056672 A1 | 3/2013 | Johnston | |
| 2013/0099438 A1 | 4/2013 | Mann | |
| 2014/0075887 A1 | 3/2014 | Akpan | |
| 2014/0141198 A1 | 5/2014 | Teran | |
| 2014/0223684 A1 | 8/2014 | Hawkins | |
| 2015/0061173 A1 | 3/2015 | Murata | |
| 2015/0140341 A1 | 5/2015 | Robinson | |
| 2016/0319553 A1 | 11/2016 | Lautzenhiser | |
| 2016/0375673 A1 | 12/2016 | Lautzenhiser | |
| 2017/0037567 A1 | 2/2017 | Love | |
| 2017/0105563 A1 | 4/2017 | Dawson | |
| 2017/0136724 A1 | 5/2017 | Dawson | |
| 2017/0136730 A1 | 5/2017 | Dawson | |
| 2017/0282497 A1 | 10/2017 | Love | |
| 2017/0282498 A1 | 10/2017 | Love | |
| 2017/0355837 A1 | 12/2017 | Bomfim | |
| 2017/0360274 A1 | 12/2017 | Love | |
| 2018/0055266 A1 | 3/2018 | Puthillath | |
| 2018/0056626 A1 | 3/2018 | Puthillath | |
| 2018/0289238 A1 | 10/2018 | Vogt | |
| 2018/0290428 A1 | 10/2018 | Puthillath | |
| 2018/0363239 A1 | 12/2018 | Love | |
| 2018/0363240 A1 | 12/2018 | Love | |
| 2019/0000254 A1 | 1/2019 | Puthillath | |
| 2019/0390466 A1* | 12/2019 | Lautzenhiser | .... E04F 15/02144 |

FOREIGN PATENT DOCUMENTS

| | | |
|---|---|---|
| CH | 526291 A | 8/1972 |
| CN | 1034482 A | 8/1989 |
| CN | 2183017 Y | 11/1994 |
| CN | 1107028 A | 8/1995 |
| CN | 102398389 | 4/2012 |
| CN | 103273716 | 9/2013 |
| CN | 103507305 | 1/2014 |
| CN | 104740827 | 7/2015 |
| DE | 2413183 | 10/1974 |
| DE | 199211303 | 12/1992 |
| DE | 19956319 | 6/2001 |
| DE | 20300915 | 5/2003 |
| DE | 102010020922 | 11/2011 |
| EP | 0325040 | 7/1989 |
| EP | 0653179 A1 | 5/1995 |
| EP | 1658804 | 5/2006 |
| EP | 1788148 | 5/2007 |
| EP | 2602385 | 6/2013 |
| GB | 875807 | 8/1961 |
| GB | 2476133 | 6/2011 |

(56) References Cited

FOREIGN PATENT DOCUMENTS

| | | |
|---|---|---|
| JP | 49001606 Y | 1/1974 |
| JP | S58112835 | 7/1983 |
| JP | H06237850 | 8/1994 |
| JP | 2003246037 | 9/2003 |
| JP | 2004052159 | 2/2004 |
| JP | 2004167819 | 6/2004 |
| JP | 2004353107 | 12/2004 |
| JP | 2005307377 | 11/2005 |
| JP | 4170953 | 10/2008 |
| JP | 2009035850 | 2/2009 |
| JP | 4545019 | 9/2010 |
| JP | 2012110571 | 6/2012 |
| JP | 2014129681 | 7/2014 |
| MX | PA06010218 A | 3/2008 |
| WO | 2001025514 | 4/2001 |
| WO | 2002072154 | 9/2002 |
| WO | 2003106161 | 12/2003 |
| WO | 2004043539 | 5/2004 |
| WO | 2006103436 | 10/2006 |
| WO | 2009050285 A1 | 4/2009 |
| WO | WO-2021011506 A1 * | 1/2021 ......... A47G 27/0418 |

OTHER PUBLICATIONS

JP 49-001606 Y translation, JPO, 1974.
YouTube video illustrating commercial product: https://Vimeo.com/user13097326/review/281991915/a9ab41530f.
D2 Milliken™ Convertible Flooring with ADAPTEX™ Active Surface Technology, 2 pages. millikenfloors.com/d2. Jul. 2018.
Title: Nanosols and Textiles. Boris Mahltig, Torsten Textor. Copyright 2008 by World Scientific Publishing Co. Pte. Ltd.; pp. 109-126.
Patent Cooperation Treaty PCT International Search Report, dated Dec. 21, 2016. International Application No. PCT/US2016/043843. International Filing Date, Jul. 25, 2016.
MX PA 06010218, English translation, Google Patents, 2006.

* cited by examiner

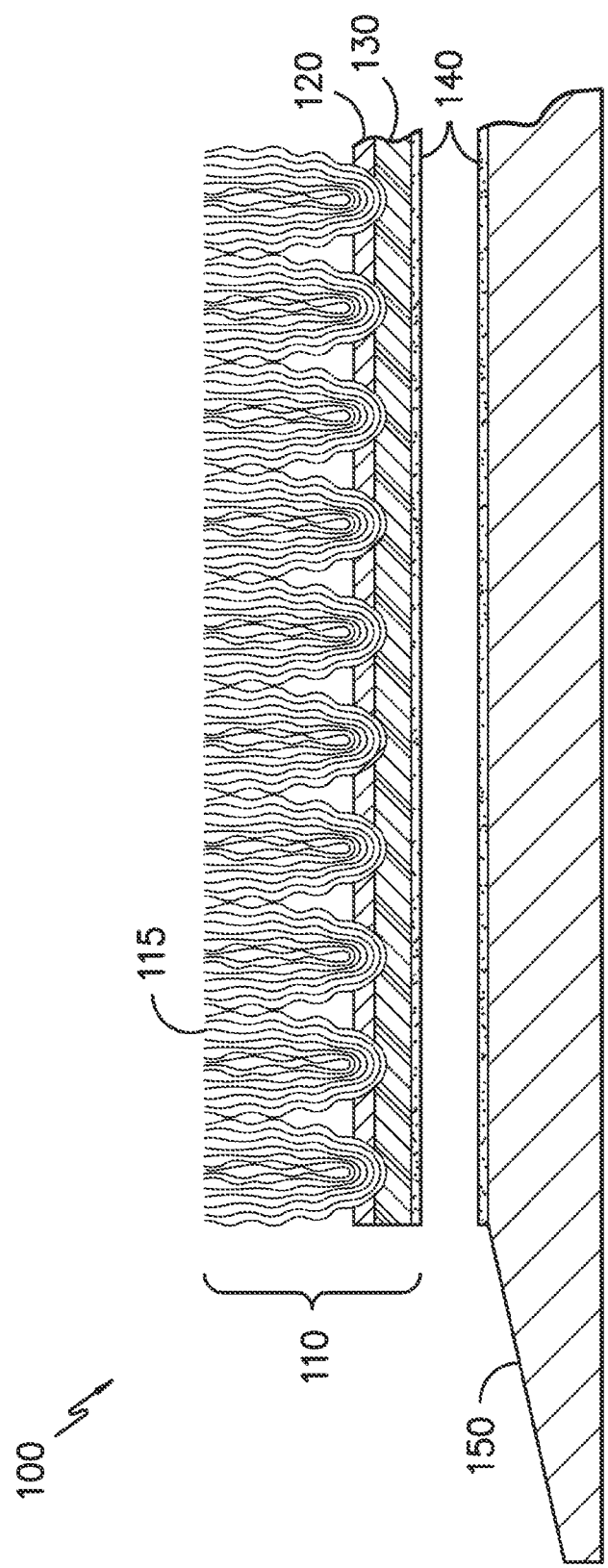
FIG. -1A-

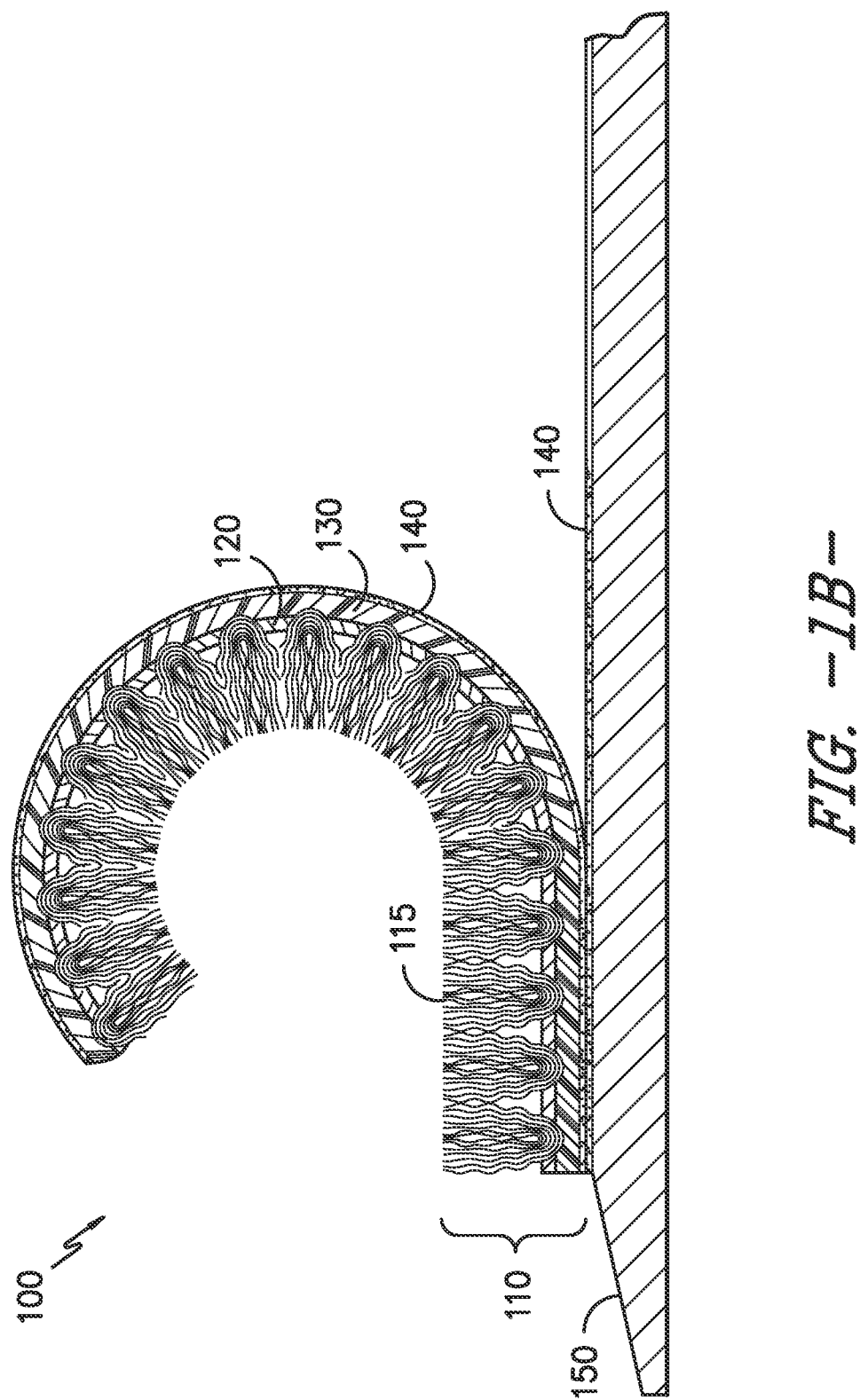
FIG. -1B-

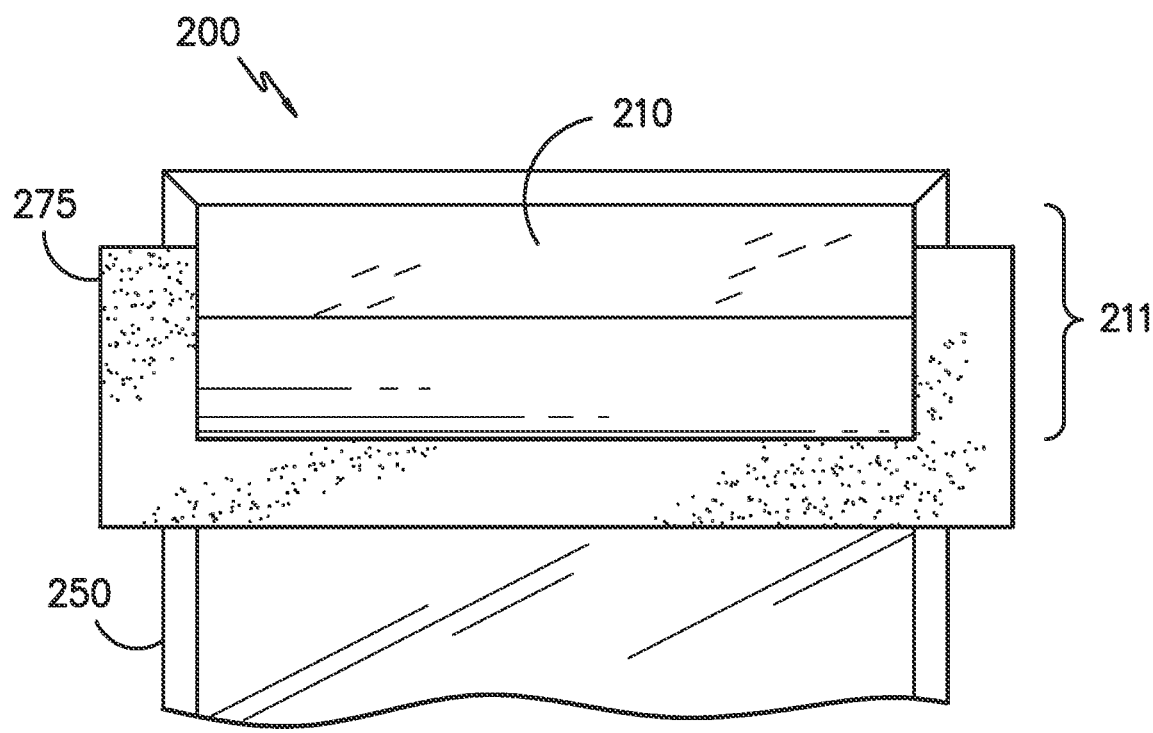
FIG. -2-
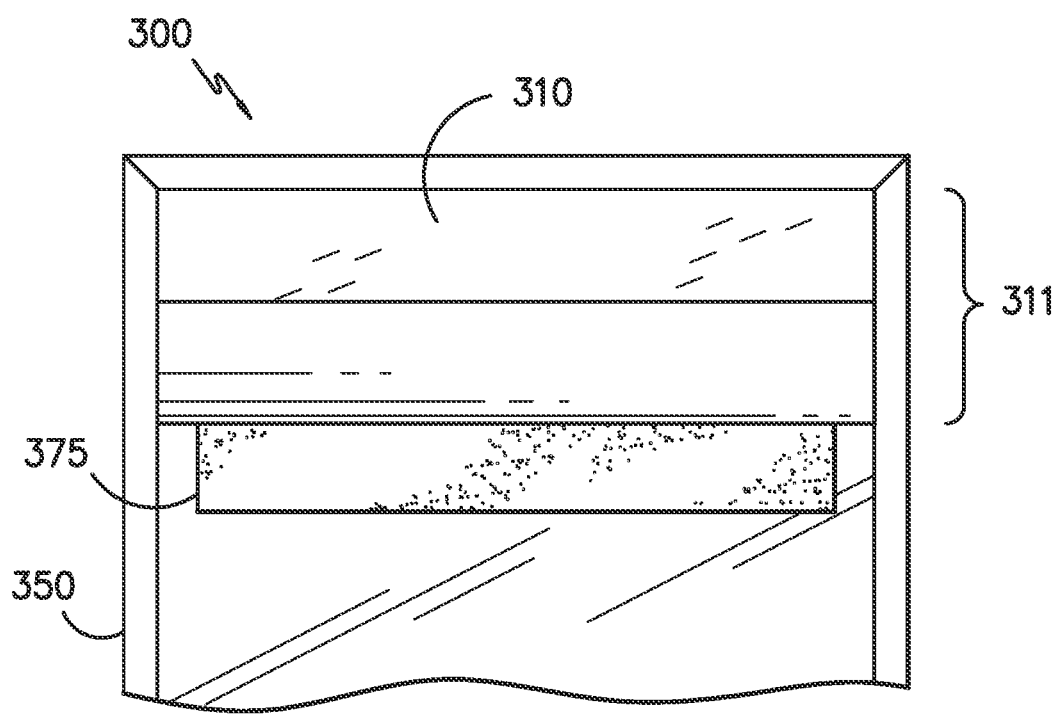
FIG. -3A-

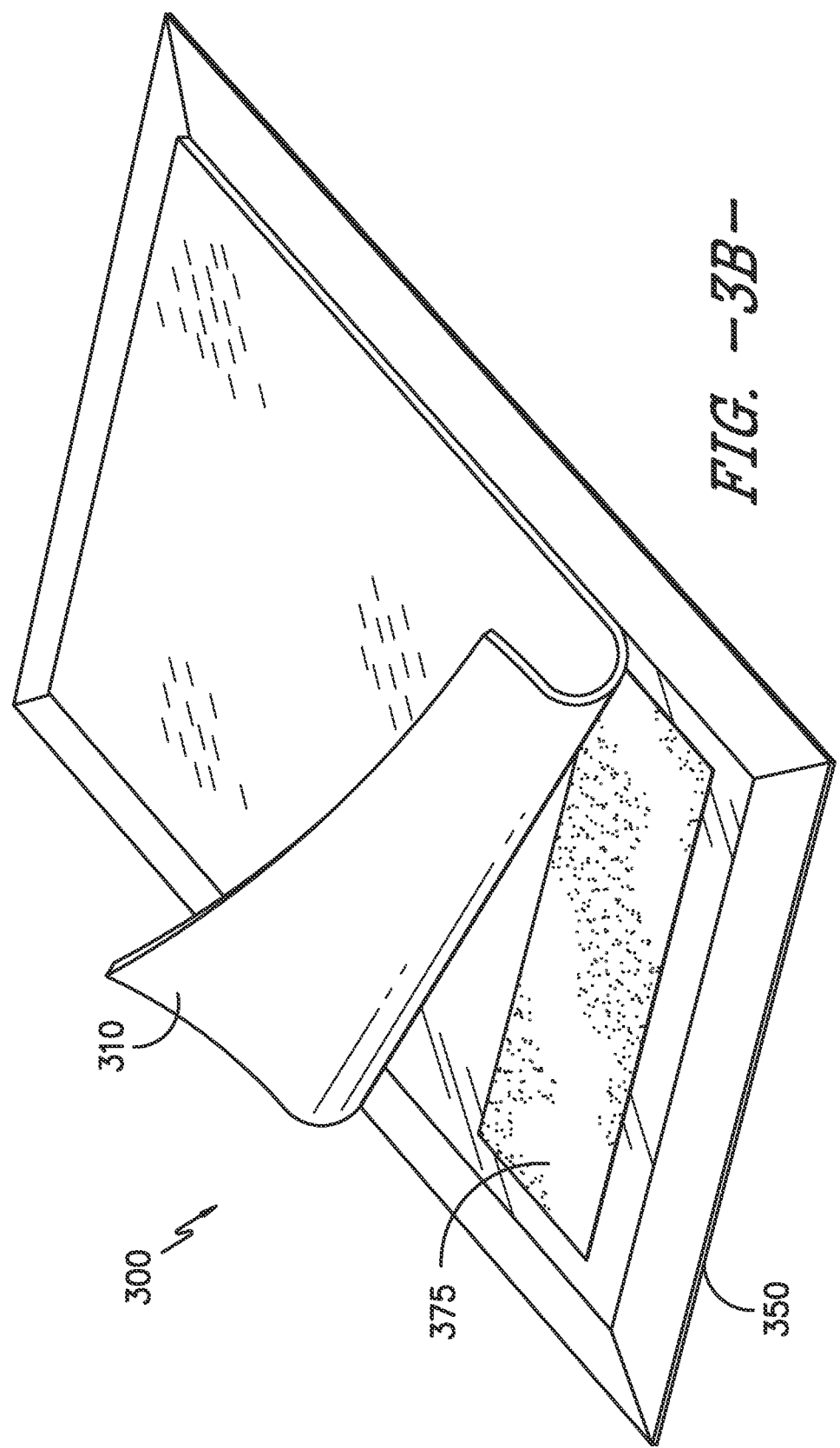
FIG. -3B-

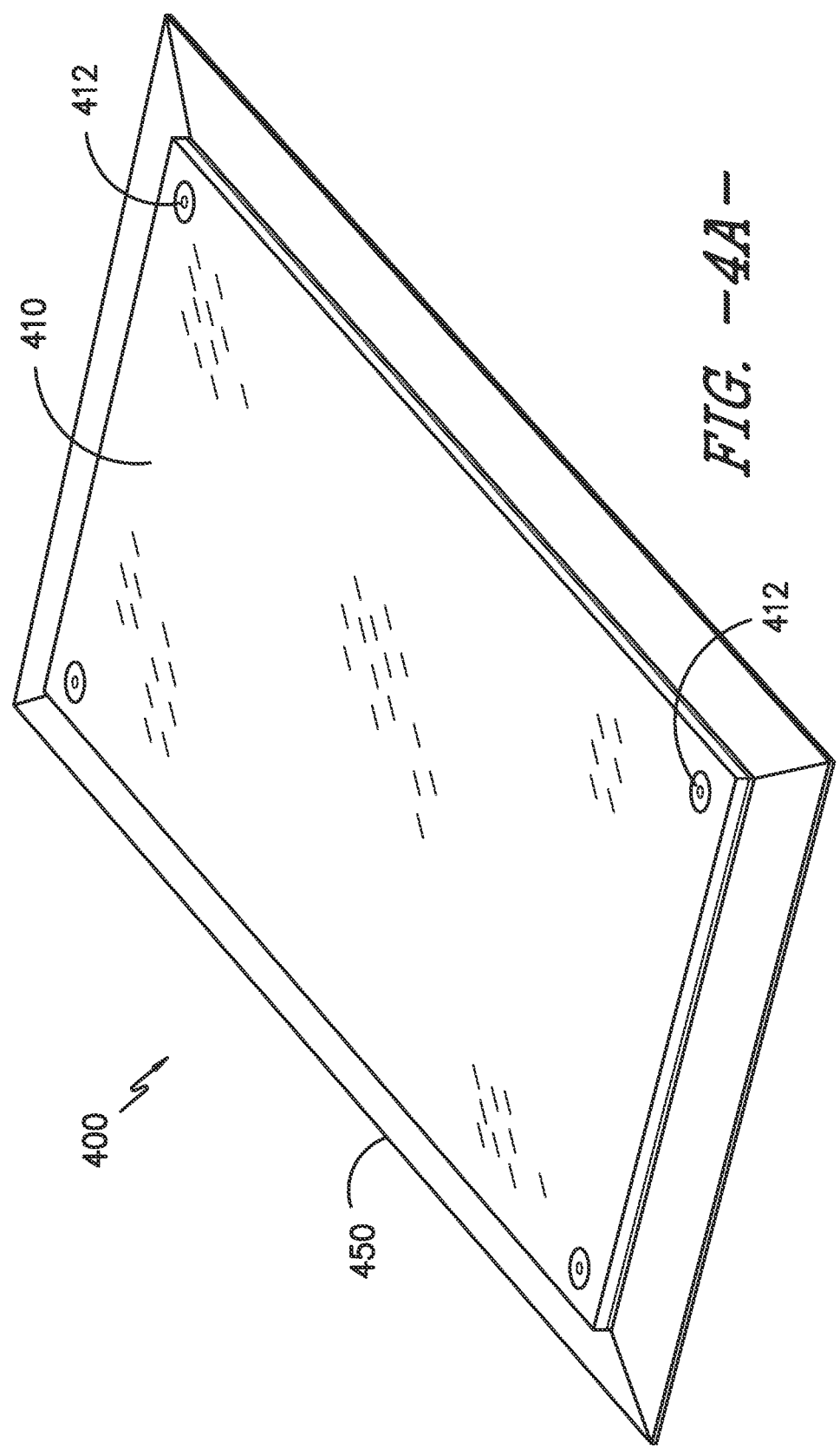
FIG. -4A-

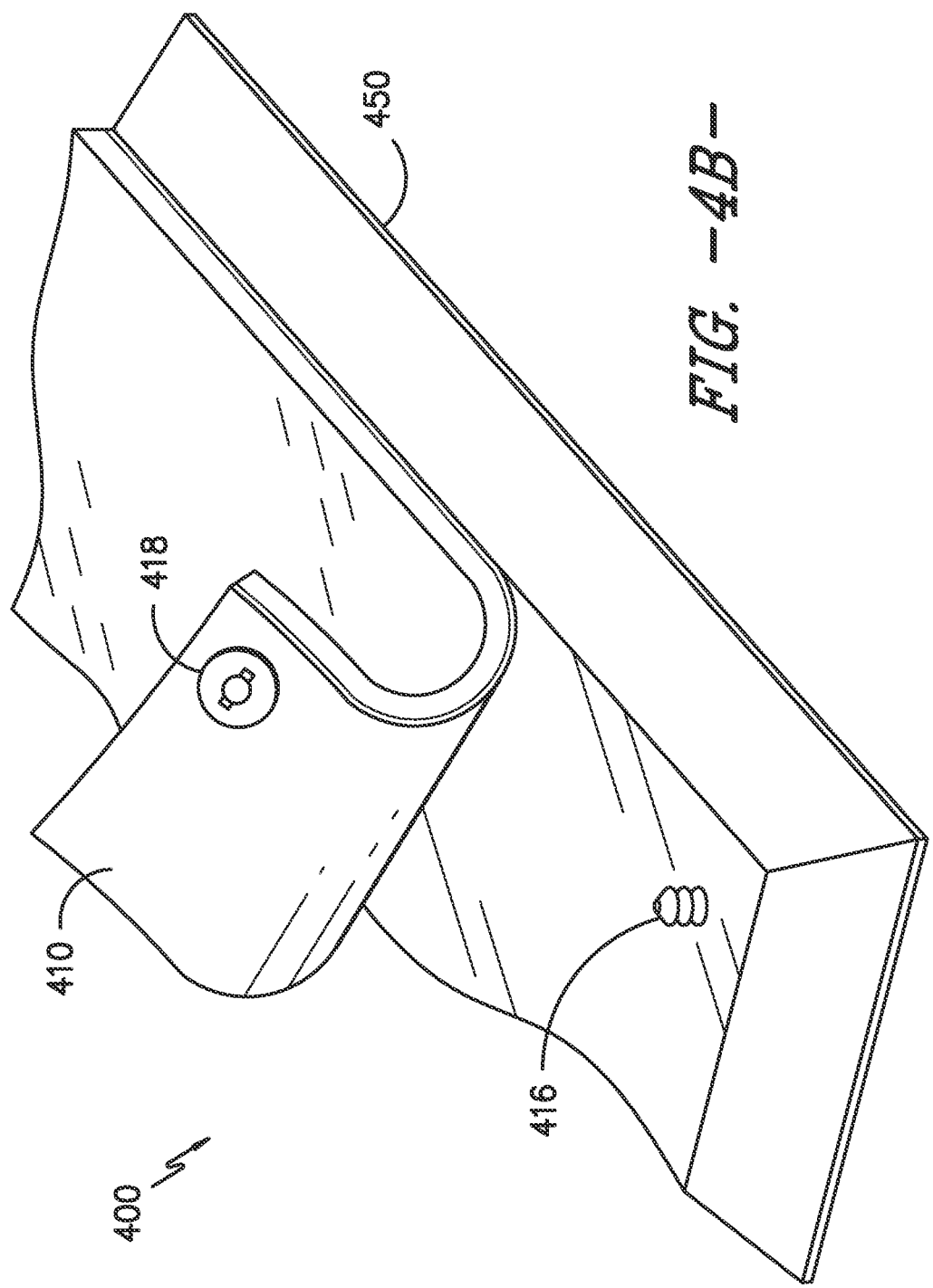

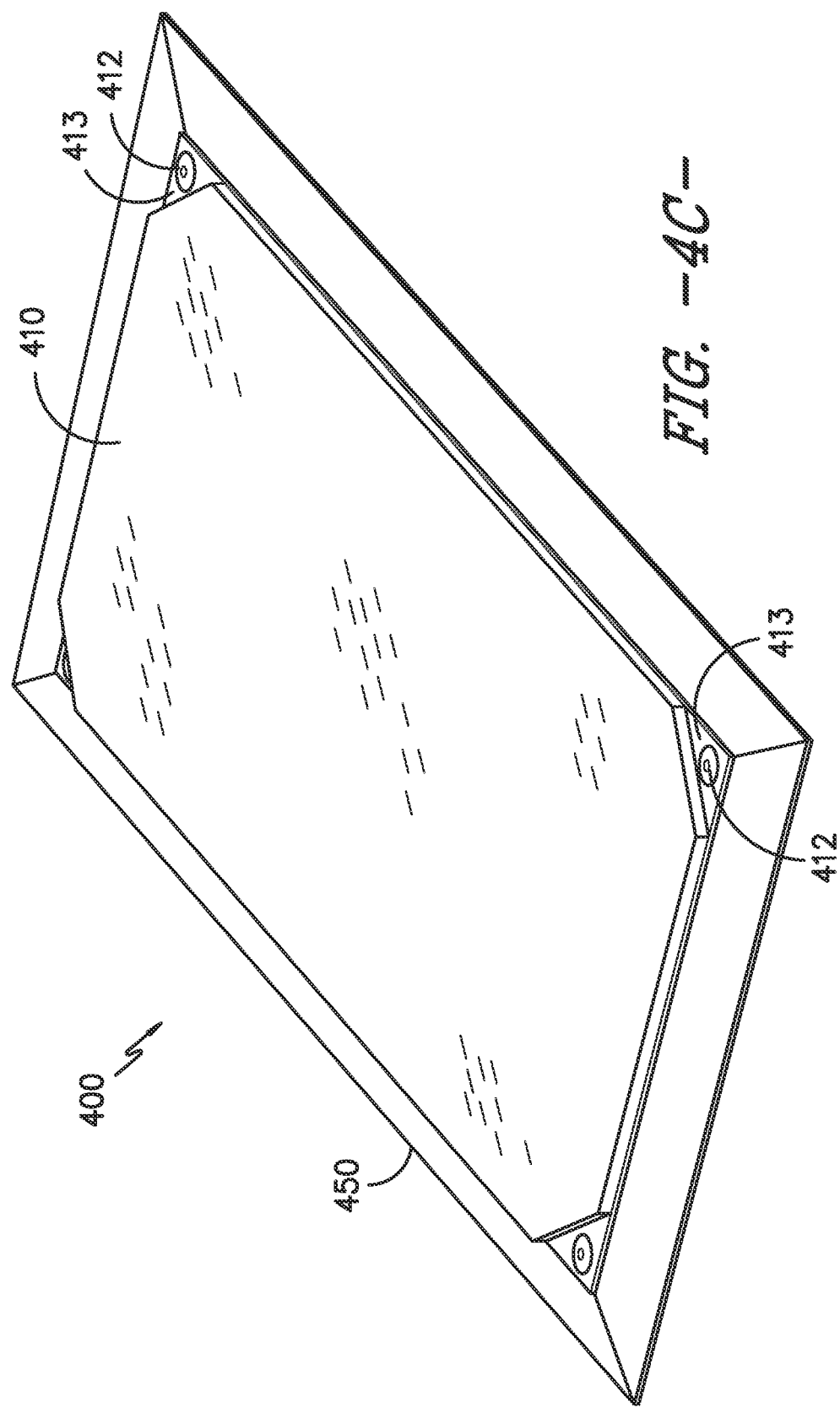

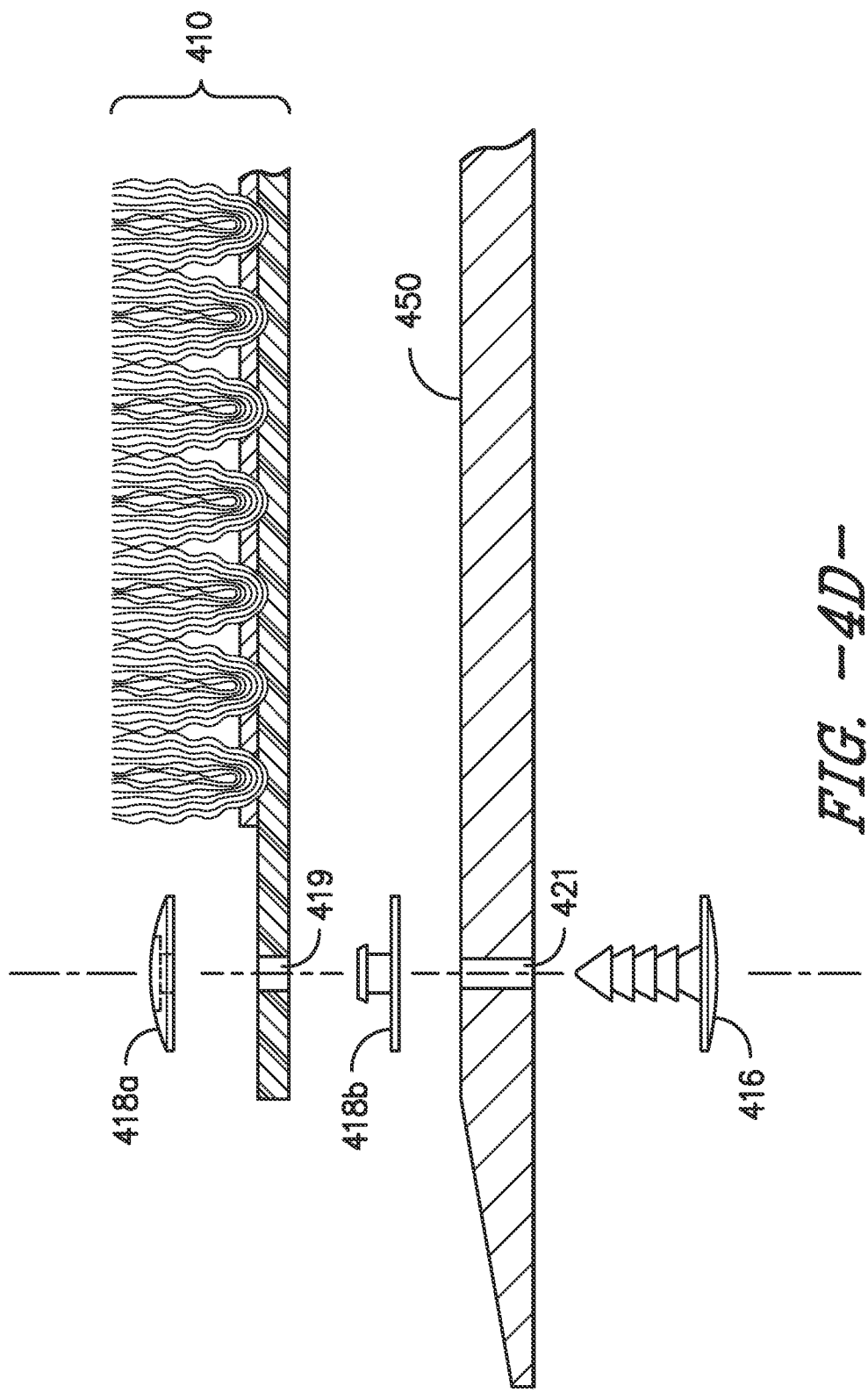
FIG. -4D-

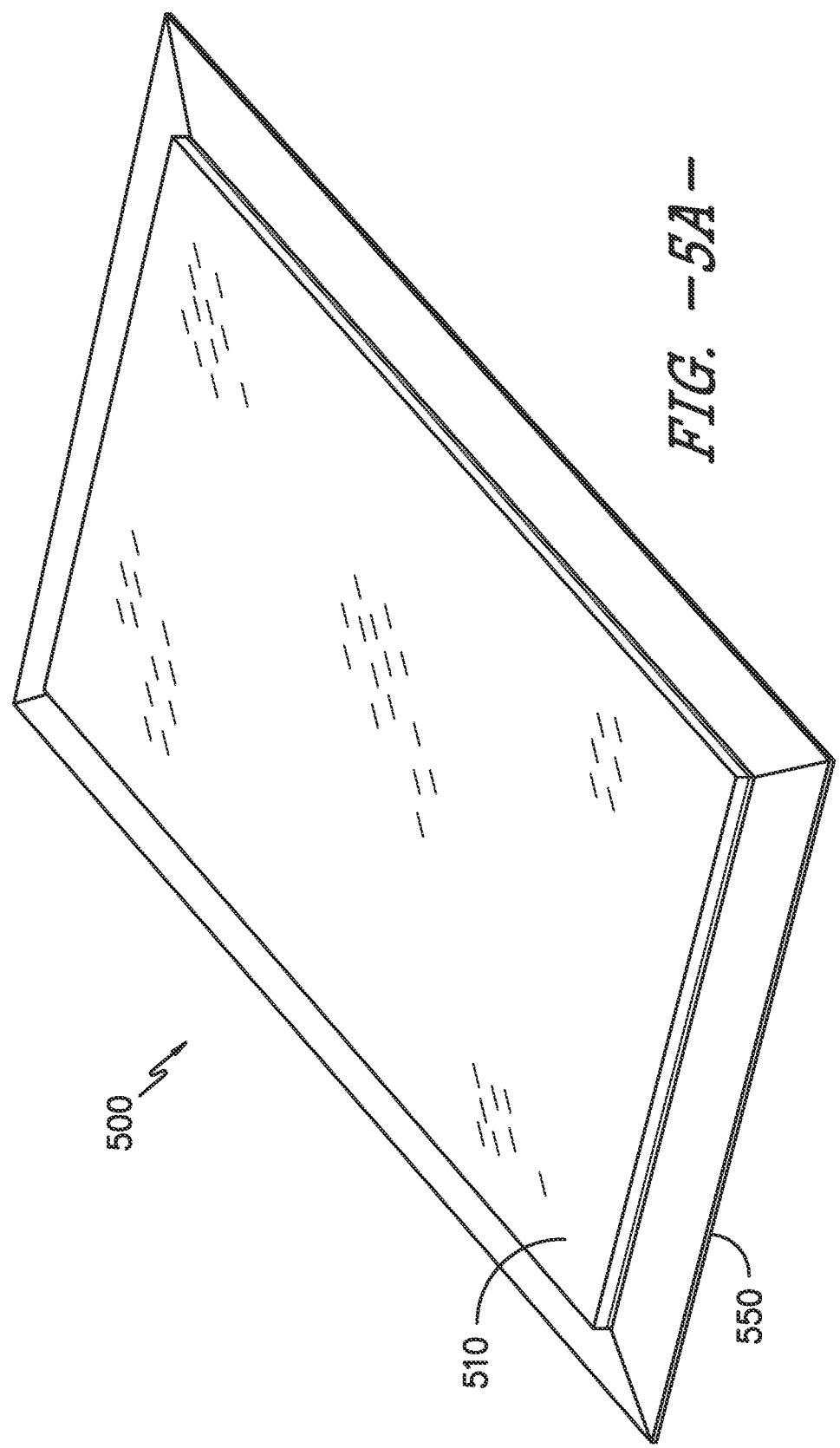
FIG. -5A-

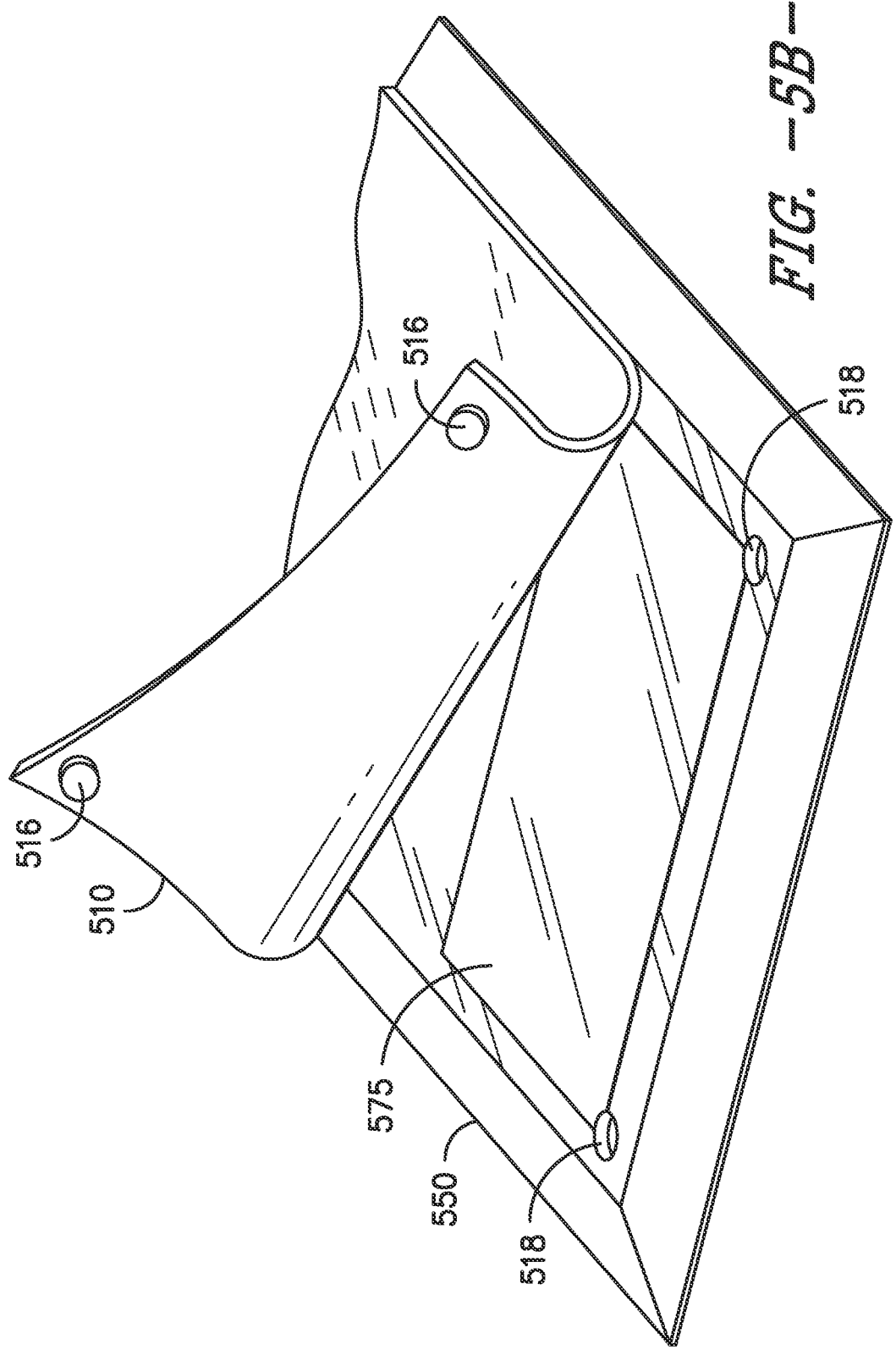

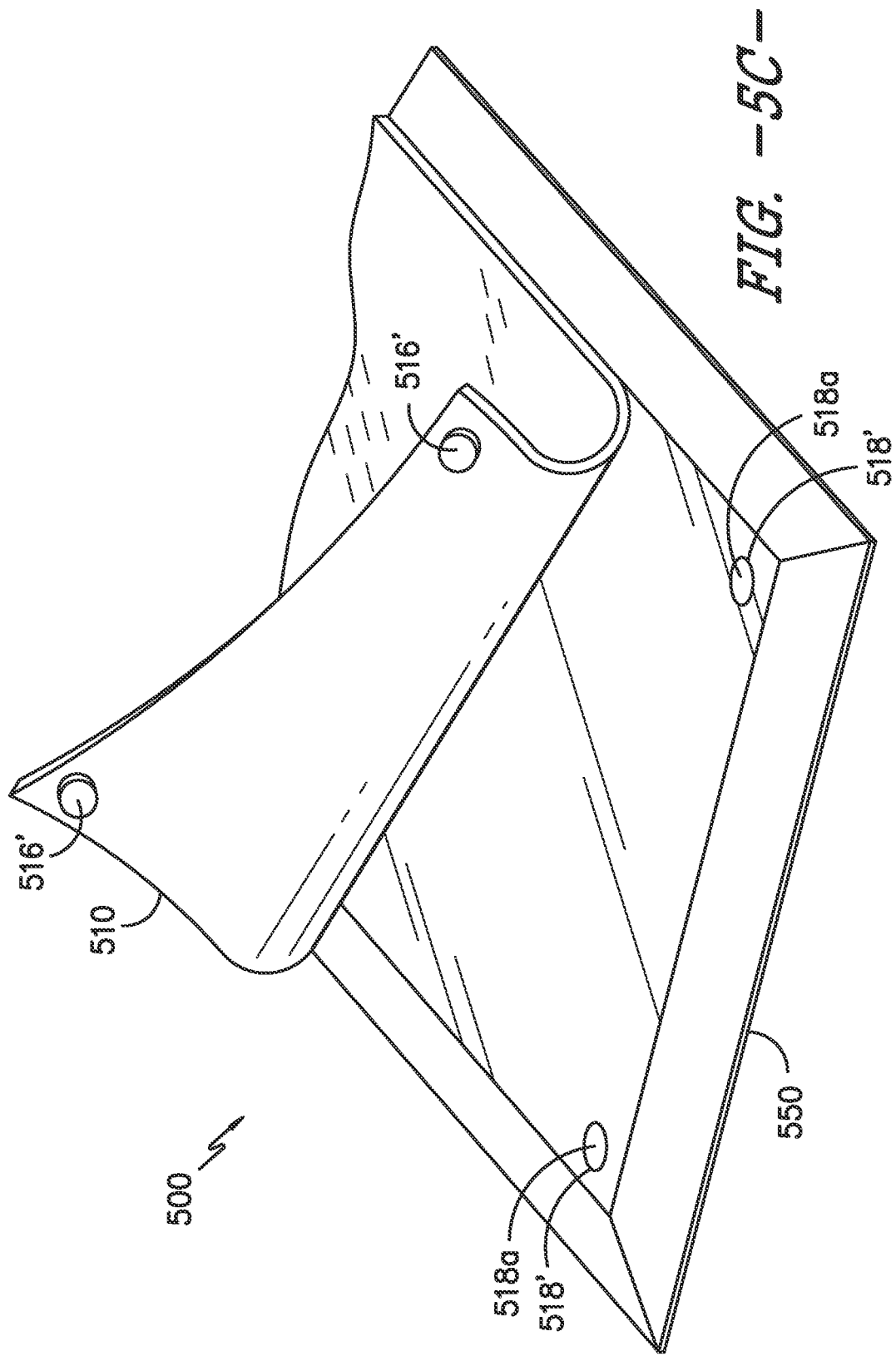

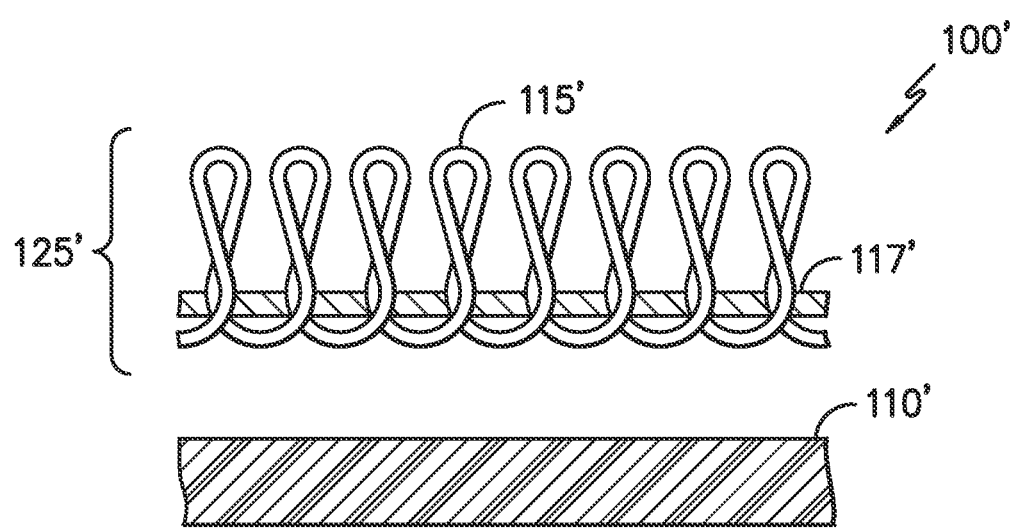
FIG. -6A-

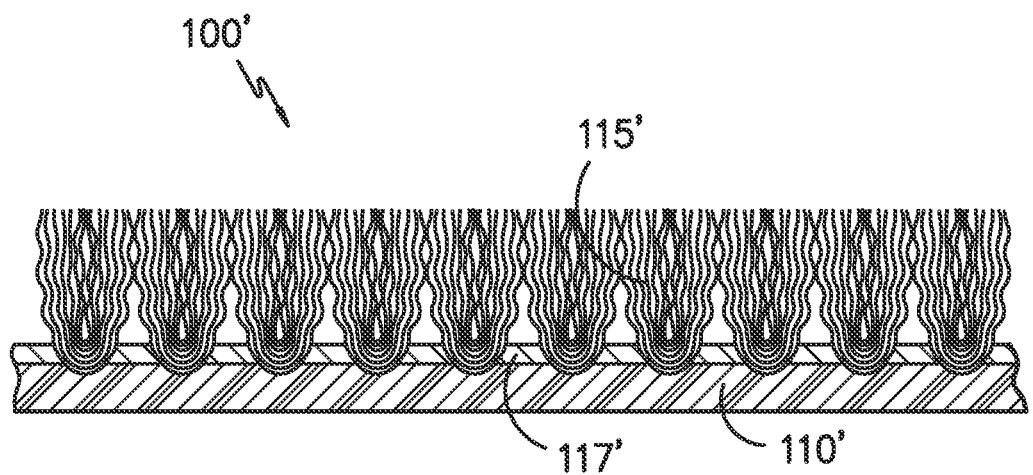
FIG. -6B-
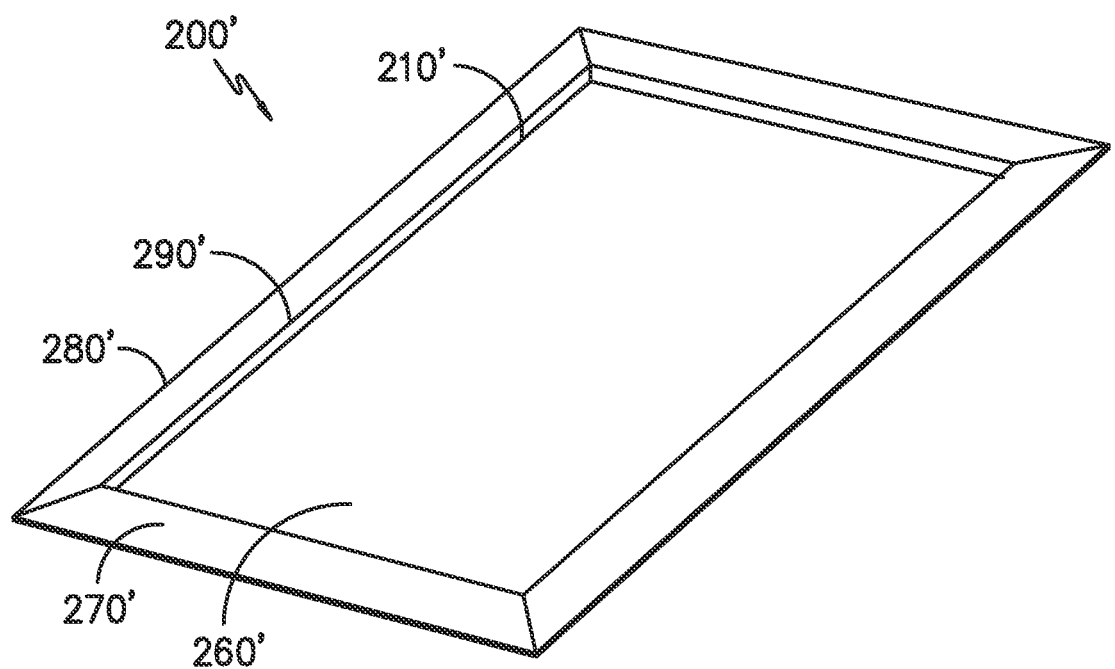
FIG. -7A-

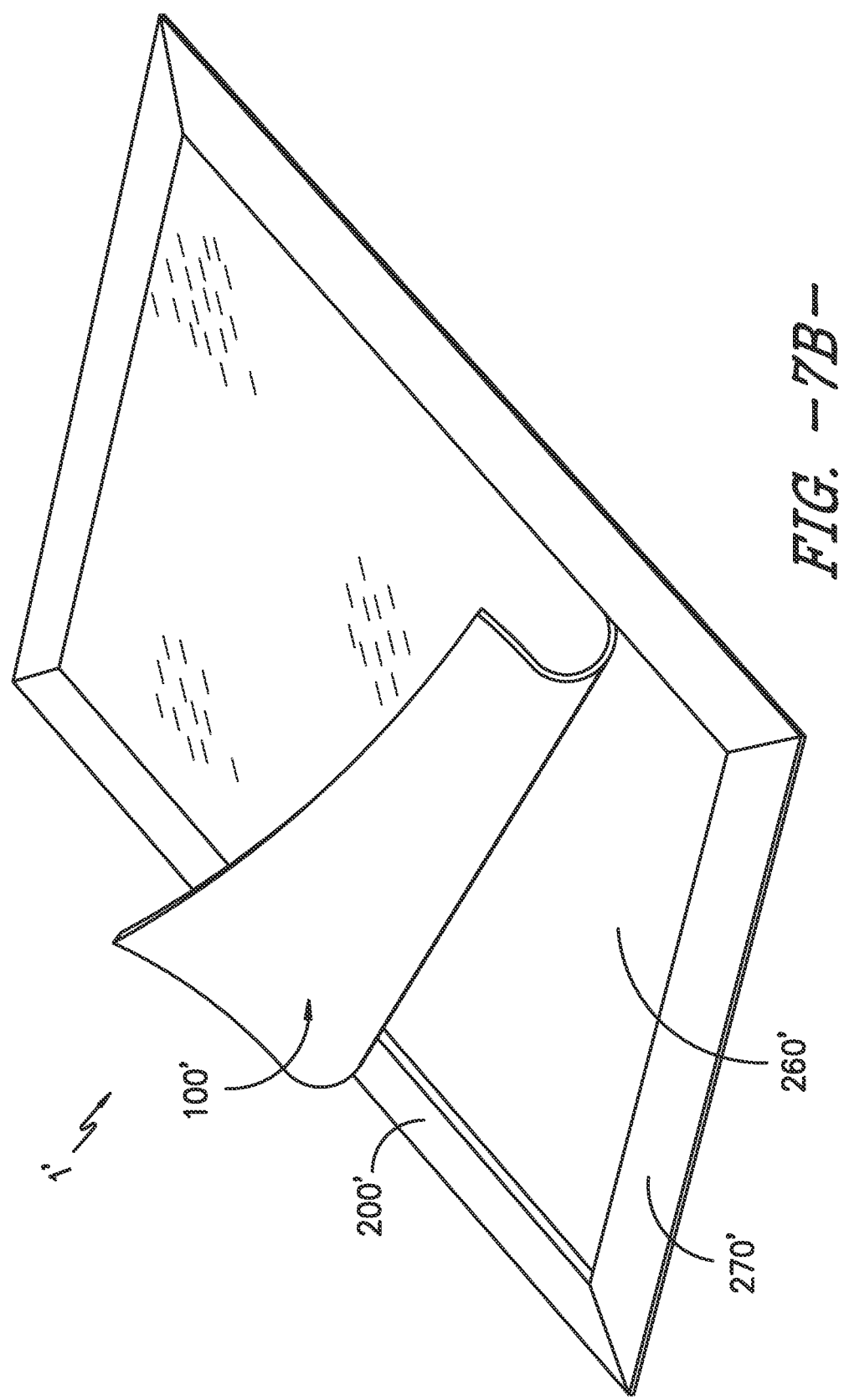
FIG. -7B-

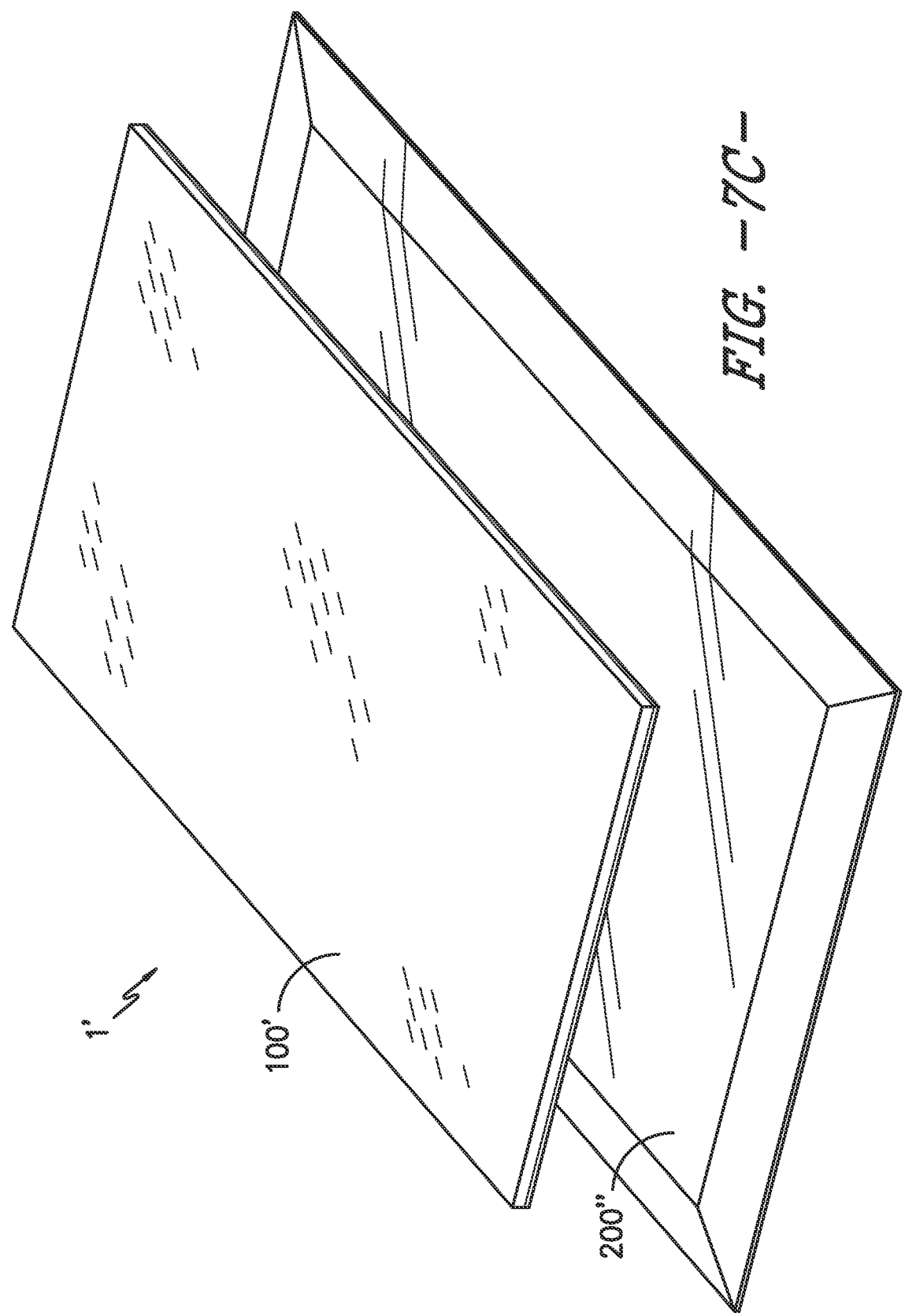
FIG. -7C-

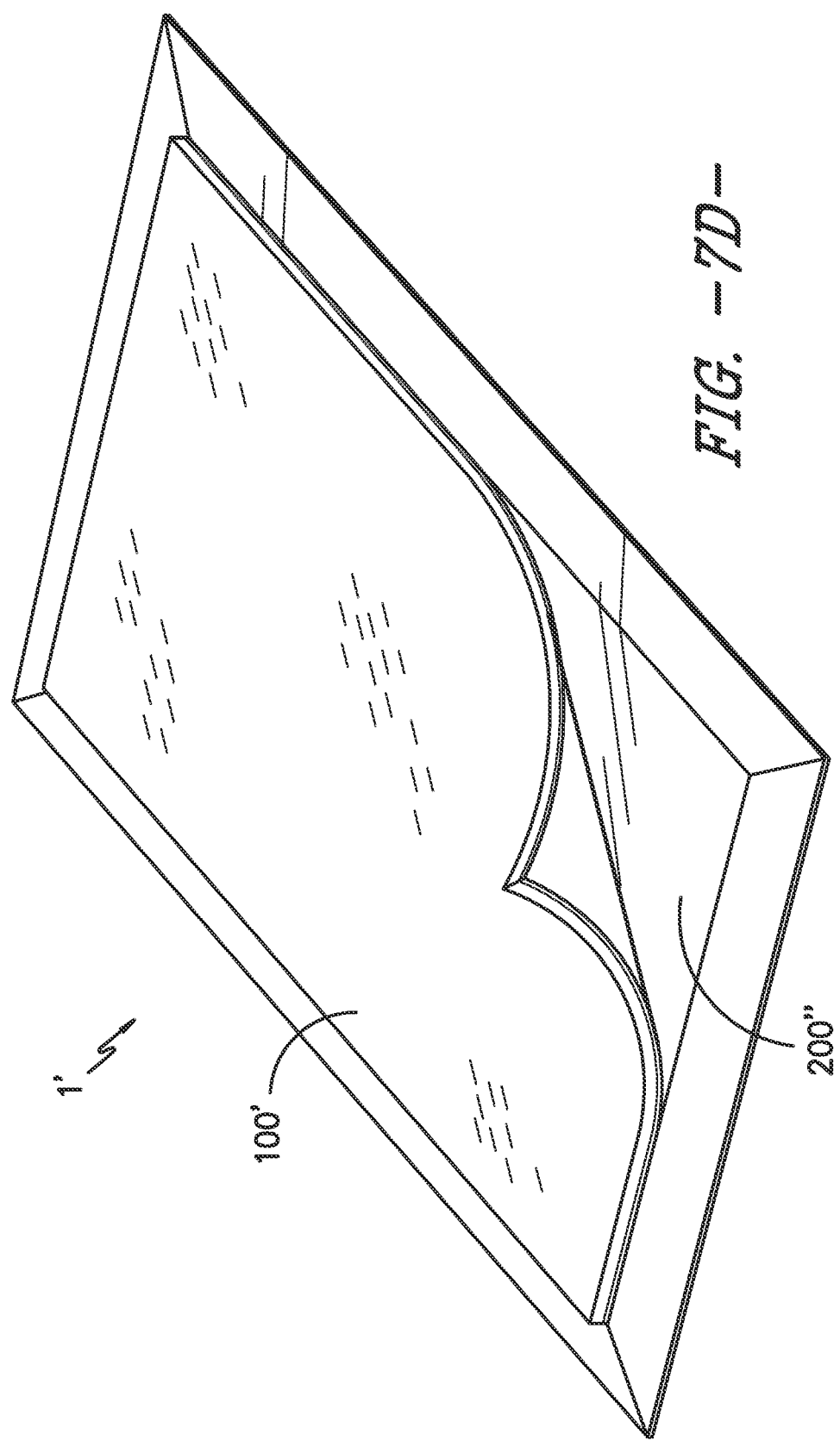
FIG. -7D-

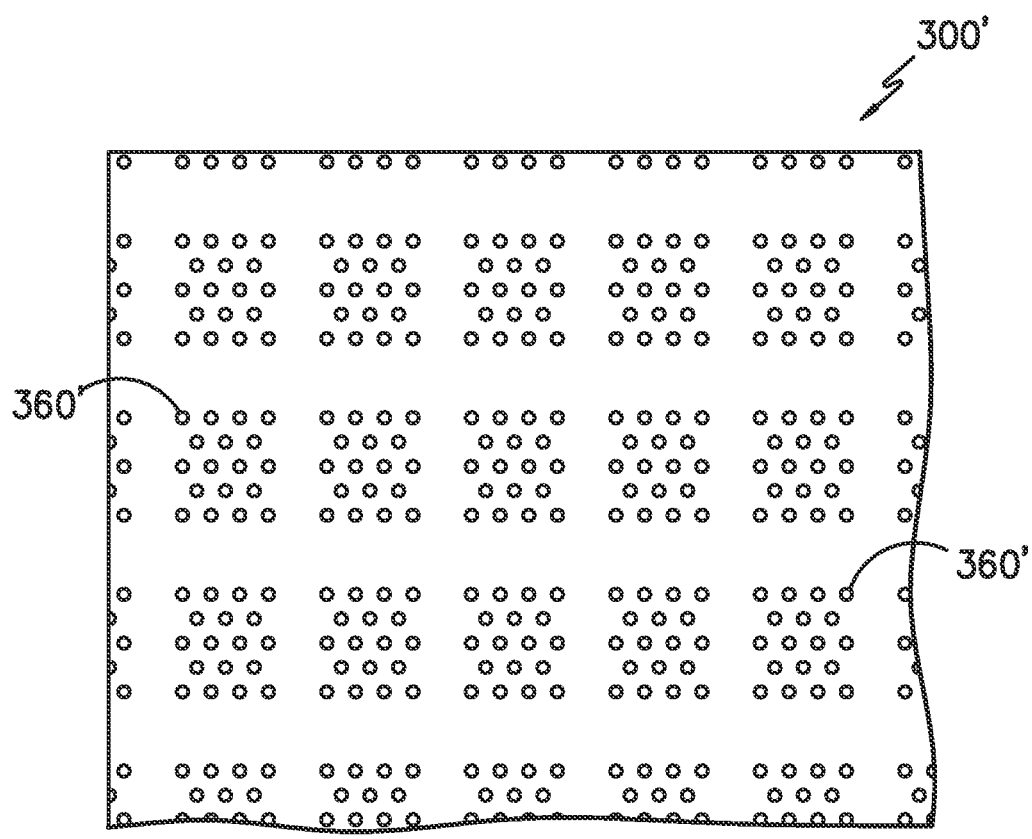
FIG. -8A-
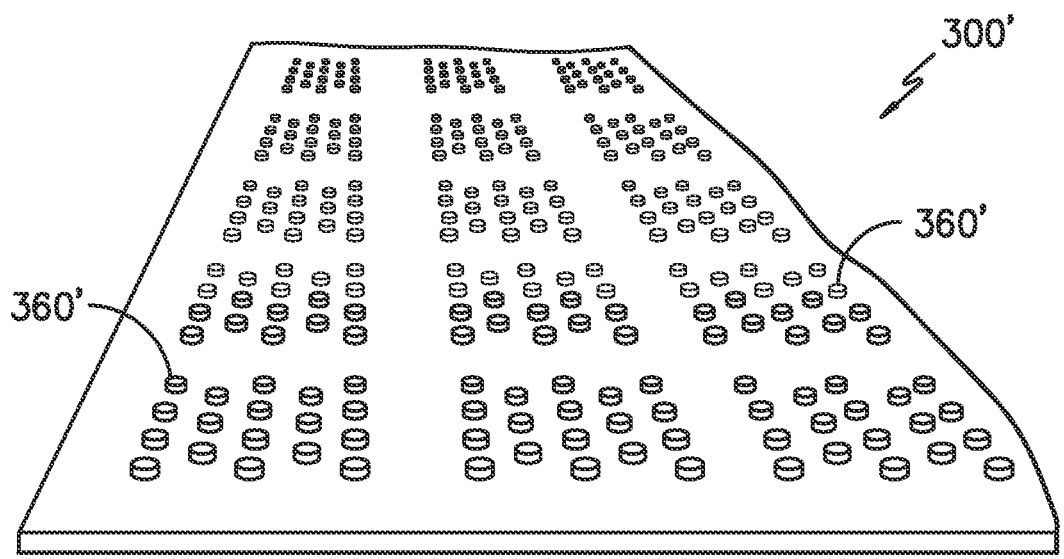
FIG. -8B-

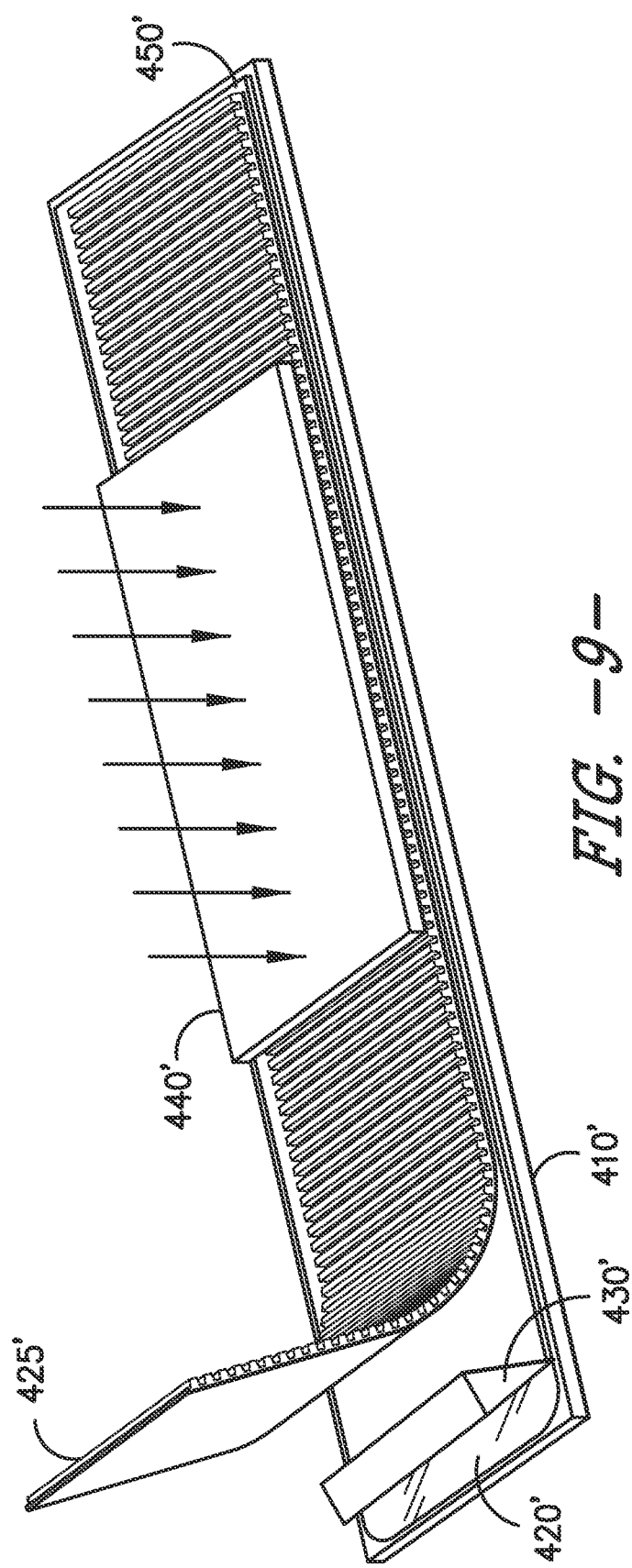
FIG. -9-

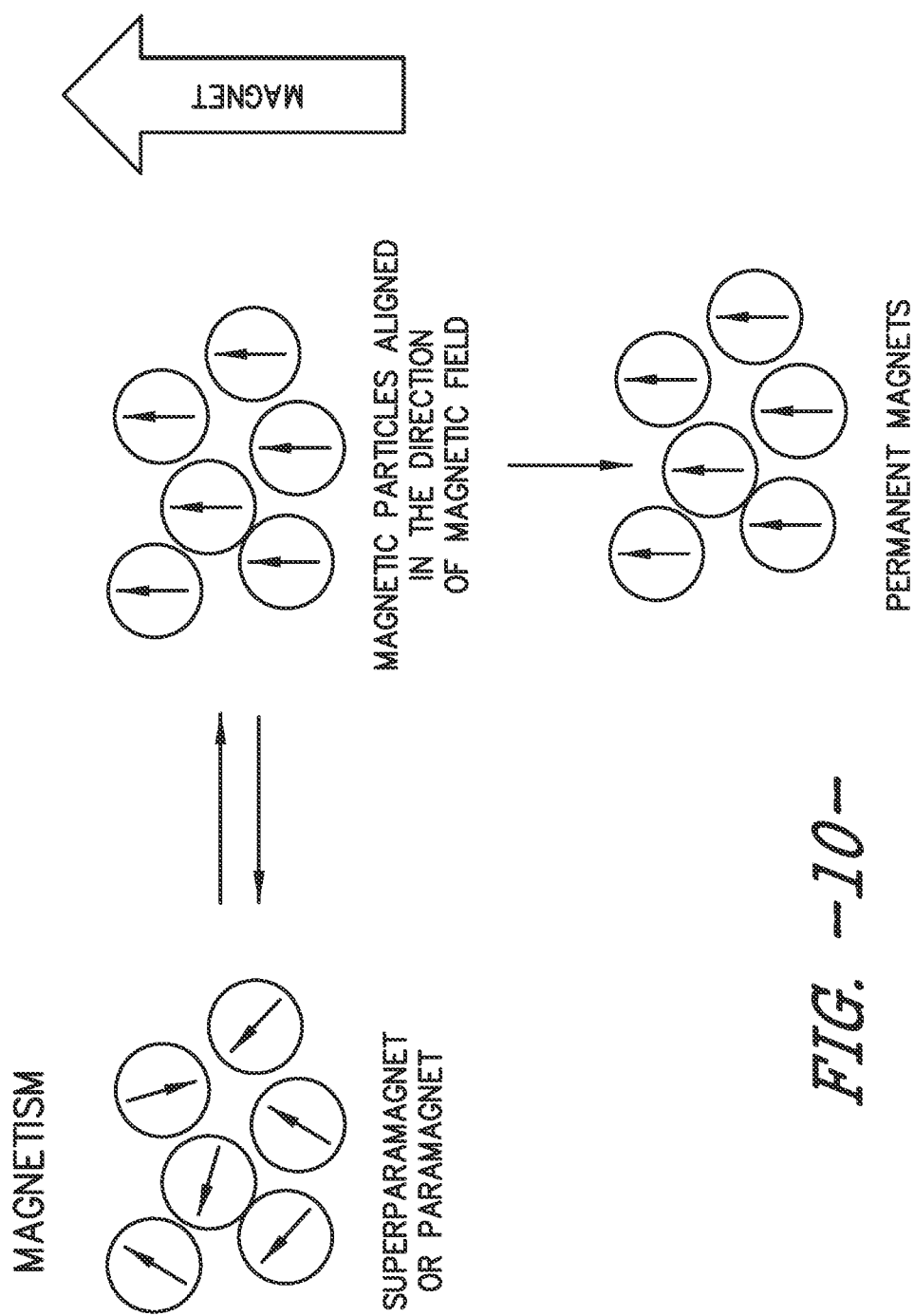
FIG. -10-

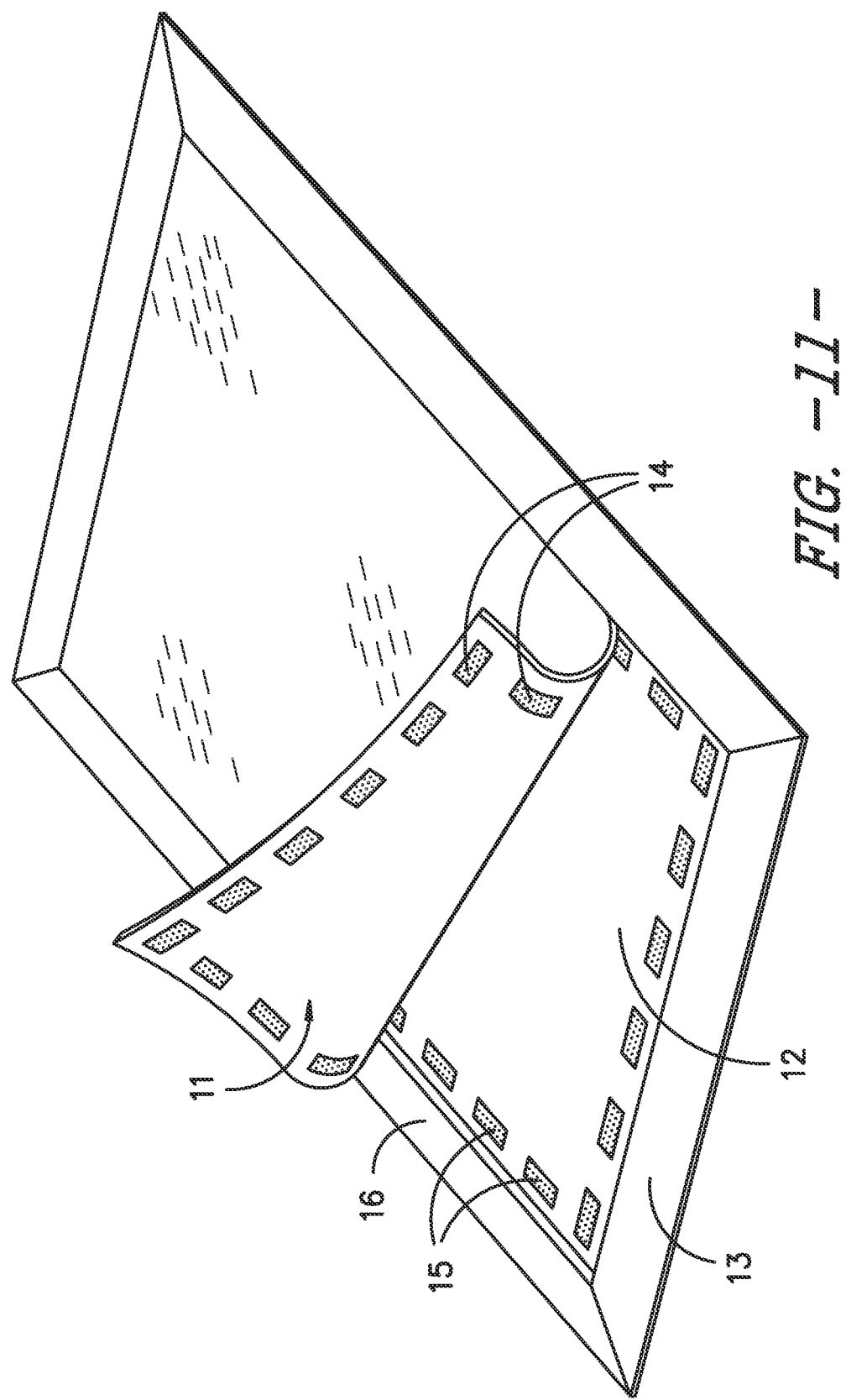
FIG. -11-

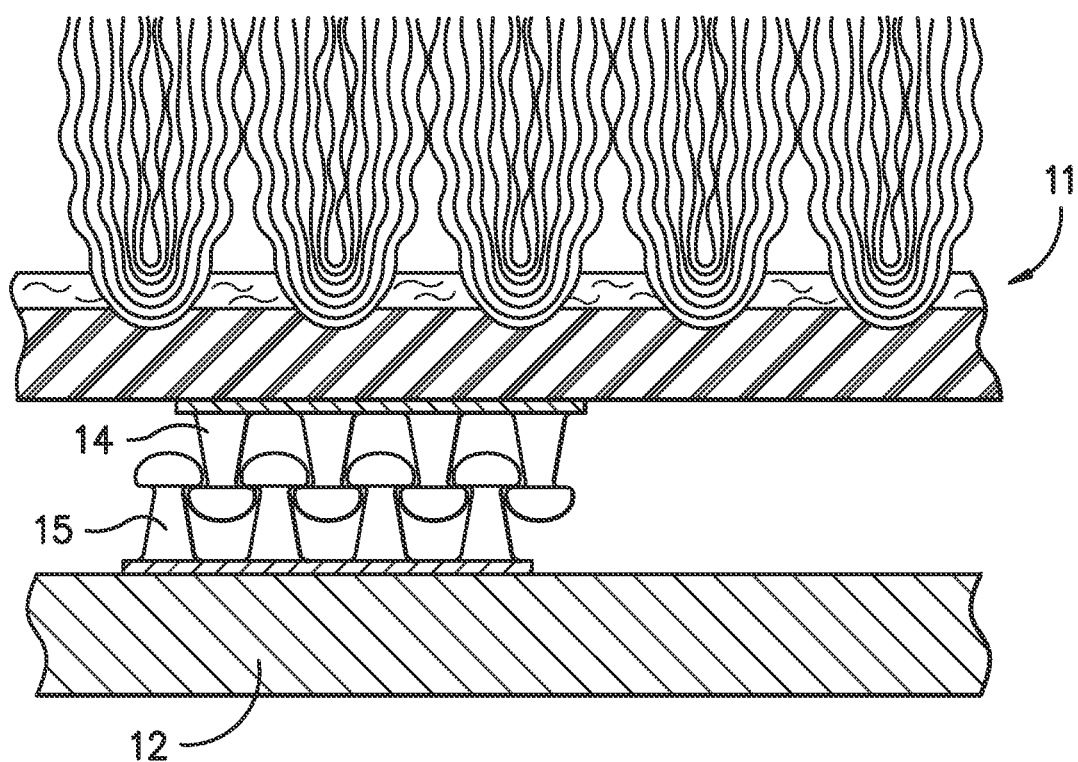
FIG. -12-

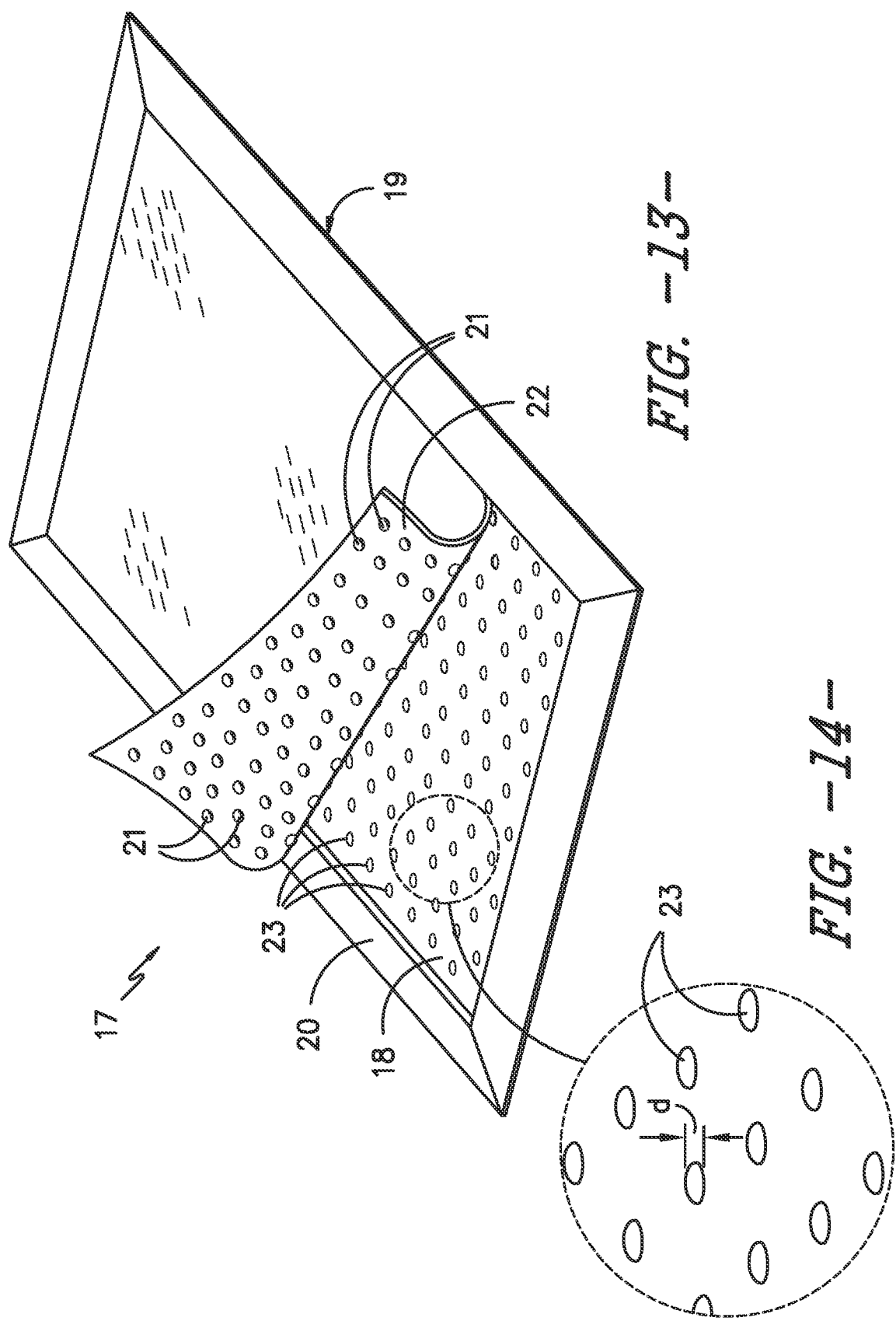

INSTALLATION OF MULTI-COMPONENT FLOOR MAT

CROSS REFERENCE TO RELATED APPLICATIONS

This application is a divisional of and claims priority to U.S. patent application Ser. No. 16/109,910, entitled "Installation of Multi-Component Floor Mat" which was filed on Aug. 23, 2018, which is a continuation of and claims priority to U.S. patent application Ser. No. 15/212,361, entitled "Installation of Multi-Component Floor Mat" which was filed on Jul. 18, 2016, which is a non-provisional of and claims priority to U.S. Provisional Patent Application No. 62/201,149, entitled "Installation of Multi-Component Floor Mat" which was filed on Aug. 5, 2015, all of which are entirely incorporated by reference herein.

TECHNICAL FIELD

This invention relates to installation methods for a multi-component floor mat. The floor mat typically contains a textile component and a base component. Alignment and deployment of the textile component with the base component in an efficient manner is described herein.

BACKGROUND

Conventional walk-off mats are made by bonding a tufted textile component to a base component typically made from a flexible rubber material. The flexible rubber material includes typical rubber materials as well as materials such as TPO, TPV, and elastomers that are generally not classified as rubbers, but can provide similar performance as rubbers. The rubber base component usually protrudes beyond the edges so as to form a rubber outer "frame" to assist in keeping the mat flat on the floor. Because the coefficient of shrinkage is different for the textile component and the rubber component, the rubber edges of the base component can deform and cause wrinkling and buckling of the mat. The rubber component can also experience premature rubber aging due to exposure to detergents and/or other chemicals during the laundering process.

The multi-component mat of the present invention does not need a rubber frame, thus eliminating the potential for deformation of the mat. Also, when the conventional one-part mat becomes dirty and needs laundering, the one-part mat is heavy and bulky making it difficult to transport. The size and weight of the combined rubber base component and textile component takes up an inordinate amount of space in industrial, commercial, and/or residential washing and drying machines. Furthermore, the entire one-part mat is exposed to heat and mechanical abrasion that may degrade the rubber comprising the mat. The multi-component floor mat described herein eliminates all of these drawbacks because the top textile component is removable from the heavy rubber base component. Once removed from the base component, the textile component can be easily laundered and re-installed on the base component. The heavy rubber base component does not need to be laundered.

The multi-component floor mat of the present invention utilizes a variety of mechanisms to attach the top textile component to the bottom base component of the floor mat. These mechanisms function to prevent undesirable movement of the textile component on the base component because such movement could result in creating trip hazards. However, because the attachment mechanisms can utilize a high amount of force to hold the top and bottom components of the floor mat together, the initial alignment and deployment of the top textile component onto the base component can present challenges. For example, when magnetic attraction is used as the attachment mechanism, the textile component will typically become immediately attached to the base component. Unless the initial alignment is perfect, the textile component will not be properly installed. Due to the magnetic strength between the components, it is generally quite difficult to slide and move the textile component on the base component to correct any mis-alignment. The problem is exaggerated by the large surface area of the two components that are in contact with one another. In this regard, even if the adherence force per unit area is low, the large surface area means that the total resistance to sliding and movement can be very high making realignment of the components very difficult. If not corrected, mis-alignment of the textile component with the base component may create trip hazards within the floor mat and may be aesthetically not pleasing.

The present invention overcomes these challenges via the use of alignment and deployment techniques that rely upon temporary reduction in surface area of the textile and/or base component and/or temporary reduction in adherence force between the textile and base components.

BRIEF SUMMARY

In one aspect, the invention relates to a method for installation of a floor mat comprising the following steps: (a) providing a base component, wherein the base component contains at least one attachment means; (b) providing a textile component, wherein the textile component is comprised of tufted pile carpet and contains at least one attachment means that works in corresponding relationship with the at least one attachment means of step "a," and wherein the base component and the textile component are releasably attachable to one another via the at least one attachment means; (c) aligning the textile component with the base component, wherein the step of aligning is accomplished via the use of at least one alignment or deployment mechanism; and (d) deploying the textile component onto the base component.

In another aspect, the invention relates to a multi-component floor mat comprising: (a) a textile component comprising (i) a first layer of tufted pile carpet formed by tufting face yarns through a primary backing layer and (ii) a second layer of vulcanized rubber material that contains magnetic particles; (b) a base component comprised of (i) vulcanized rubber that contains magnetic particles or (ii) vulcanized rubber having a magnetic coating applied thereto; wherein the textile component and the base component are releasably attachable to one another via magnetic attraction; and (c) at least one alignment and deployment mechanism.

In another aspect, the invention relates to a multi-component floor mat comprising: (a) a textile component comprising (i) tufted pile carpet wherein face yarns are tufted through a primary backing layer and (ii) a magnetic coating wherein the magnetic coating is comprised of magnetic particles and a binder material; (b) a base component comprised of (i) vulcanized rubber that contains magnetic particles or (ii) vulcanized rubber having a magnetic coating applied thereto; wherein the textile component and the base component are releasably attachable to one another via magnetic attraction; and (c) at least one alignment and deployment mechanism.

In a further aspect, the invention relates to a multi-component floor mat comprising: (a) a textile component comprising (i) a first layer of tufted pile carpet wherein face yarns are tufted through a primary backing layer and (ii) a second layer of vulcanized rubber material that contains magnetic particles or a second layer of magnetic coating; (b) a base component comprised of (i) vulcanized rubber and magnetic particles or vulcanized rubber and a magnetic coating and (ii) electronic sensors; wherein the textile component and the base component are releasably attachable to one another via magnetic attraction; and (c) at least one alignment and deployment mechanism.

In another aspect, the invention relates to a two part floor covering, comprising: (a) a base having a planar tray, the tray having an upper surface; (b) a mat overlaying the tray, the mat having (i) a sheet-like substrate with an upper face and a lower face; (ii) pile yarns extending from the upper face of the substrate; and (iii) a backing layer attached to the lower face of the substrate; (c) a fastening system for detachably securing the mat to the base tray, the fastening system having a mushroom-type hook fastener first component and a second component that is capable of engaging the first component to create a fastener, wherein the second component is selected from the group consisting of mushroom-type hook fasteners, loop strips and a fabric capable of being penetrated by the hooks of the first component, provided that first component is attached to either the backing layer of the mat or the tray and the second component is attached opposite the first component, to either the backing layer of the mat or the tray; and (d) at least one alignment and deployment mechanism.

In yet another aspect, the invention relates to a two part floor covering, comprising: (a) a base having a planar tray, the tray having an upper surface; (b) a mat overlaying the tray, the mat having (i) a sheet-like substrate with an upper face and a lower face; and (ii) a backing layer attached to the lower face of the substrate; (c) a fastening system for detachably securing the mat to the base tray, the fastening system having a mushroom-type hook fastener first component and a second component that is capable of engaging the first component to create a fastener, wherein the second component is selected from the group consisting of mushroom-type hook fasteners, loop strips and a fabric capable of being penetrated by the hooks of the first component, provided that first component is attached to either the backing layer of the mat or the tray and the second component is attached opposite the first component, to either the backing layer of the mat or the tray; and (d) at least one alignment and deployment mechanism.

In another aspect, the invention relates to a two part floor covering, comprising: (a) a base having a planar tray, the tray having an upper surface; (b) a mat overlaying the tray, the mat having (i) a sheet-like substrate with an upper face and a lower face; (ii) pile yarns extending from the upper face of the substrate; and (iii) a backing layer attached to the lower face of the substrate; wherein the backing layer or the tray or both incorporate a structure to increase the coefficient of friction between the mat and the base selected from the group consisting of a textured surface, complimentary surfaces, surface projections and a layer of tacky material; and (c) at least one alignment and deployment mechanism.

In a further aspect, the invention relates to a multi-component floor mat comprising: (a) a textile component comprising (i) a first layer of tufted pile carpet formed by tufting face yarns through a primary backing layer and (ii) a second layer of vulcanized rubber material that contains magnetic particles; (b) a base component comprised of (i) materials selected from the group consisting of concrete, cellulose-containing materials, metal, thermoplastic materials, thermoset materials, and combinations thereof, and (ii) magnetic particles or a magnetic coating applied to the base component; wherein the textile component and the base component are releasably attachable to one another via magnetic attraction; and (c) at least one alignment and deployment mechanism.

BRIEF DESCRIPTION OF THE DRAWINGS

FIG. 1A is an expanded side view of a textile component and a base component comprising a multi-component floor mat.

FIG. 1B is an expanded side view of a rolled up textile component ready for deployment to a base component comprising a multi-component floor mat.

FIG. 2 is a top perspective of one embodiment of an alignment and deployment mechanism in use with a multi-component floor mat.

FIG. 3A is a partial top perspective of another of an alignment and deployment mechanism in use with a multi-component floor mat.

FIG. 3B is an expanded planar view of the floor mat of FIG. 3A with a portion of the textile component pulled back from the base component to expose the alignment and deployment mechanism.

FIG. 4A is an expanded planar view of a properly aligned multi-component floor mat with corner attachment means.

FIG. 4B is an expanded view of the floor mat of FIG. 4A with the textile component pulled back to expose the corner attachment means.

FIG. 4C is a top perspective view of another embodiment of a properly aligned multi-component floor mat with corner attachment means.

FIG. 4D is an expanded side view of the corner attachment means of FIG. 4C.

FIG. 5A is a top perspective view of a properly aligned multi-component floor mat without corner attachment means.

FIG. 5B is partial view of a multi-component floor mat with the textile component partially pulled back showing the alignment and deployment mechanism and a variation of corner attachment means.

FIG. 5C is a partial view of a multi-component floor mat with the textile component partially pulled back showing another variation of corner attachment means.

FIG. 6A is an expanded view of the textile component of the floor mat.

FIG. 6B is an expanded view of another embodiment of the textile component of the floor mat.

FIG. 7A is a top perspective view of one embodiment of the base component of the floor mat.

FIG. 7B is a top perspective view of the multi-component floor mat with the textile component partially pulled back from the recessed area of a base component.

FIG. 7C is a top perspective view of the multi-component floor mat with the textile component and a flat (no recessed area) base component.

FIG. 7D is a top perspective view of the multi-component floor mat with the textile component partially pulled back from the flat (no recessed area) base component.

FIG. 8A is an expanded planar view of a rubber gripping pattern present on the back of the base component of the floor mat.

FIG. 8B is an expanded angle view of a rubber gripping pattern present on the back of the base component of the floor mat.

FIG. 9 is a schematic diagram of one embodiment of the manufacturing process of the multi-component floor mat.

FIG. 10 is a schematic diagram illustrating the magnetic alignment properties of the magnetic particles of the present invention.

FIG. 11 is a top perspective view of a two part floor covering with the mat partially pulled back to expose the mushroom-type fastening system.

FIG. 12 is a side cross-sectional view of the mushroom-type fastening system.

FIG. 13 is a top perspective view of a two part floor covering with the mat partially pulled back to expose the projections extending from both the mat and the base.

FIG. 14 is an enlarged view of the projections extending from the tray section of the base component.

DETAILED DESCRIPTION

The present invention described herein is a method for installing multi-component floor mats. The method utilizes a variety of alignment and deployment mechanisms for properly and efficiently positioning the floor mats. The floor mats are comprised of a textile component and a base component.

The textile component and the base component are releasably attachable to one another via variety of attachment mechanisms. These include magnetic attraction (such as magnetic coatings, magnetic particles dispersed within a rubber or binder material, spot magnets, and the like), mechanical fasteners (such as Velcro® fastening systems, mushroom-shaped protrusions, grommets, and the like), adhesive attraction (such as cohesive materials, silicone materials, and the like), and combinations thereof. Each of these attachment mechanisms will be described in greater detail below.

Referring now to the Figures, FIG. 1A illustrates a floor mat 100 comprised of a textile component 110 and a base component 150. Textile component 110 is comprised of face fibers 115 tufted through a primary backing layer 120. An optional secondary backing layer 130 comprised of vulcanized rubber may also be included. The textile component 110 further includes a magnetic coating 140. A magnetic coating 140 may also be added to base component 150.

FIG. 1B illustrates an alignment and deployment technique for floor mat 100 of FIG. 1A whereby textile component 110 is rolled up into a roll and then placed down on the base component 150. This alignment and deployment technique relies upon the property of surface area reduction between magnetic coatings 140. By rolling up textile component 110 prior to placing it (or deploying it) onto base component 150, magnetic attraction between the components is reduced. Thus, when the textile component is rolled up into a fairly tight roll (with the face yarns rolled inward of the roll) and then the rolled up textile component is aligned on the base component, the total attractive force is so reduced that a service person or installer can slide the roll enough to allow good alignment with the base component using only the exposed end of the roll as a guide to align to the base component. This installation method relies upon reduction in surface area between the textile component and the base component.

Additional alignment and deployment techniques based upon masking or blocking properties are shown in FIGS. 2, 3A and 3B. FIG. 2 illustrates a portion of a floor mat with alignment/deployment means. Floor mat 200 is comprised of a textile component 210 rolled back upon itself. Between textile component 210 and base component 250 lies a sheet of material 275 used to aid in aligning and deploying textile component 210 onto base component 250. The sheet of material 275 is located under an upper portion 211 of textile component 210. The sheet of material 275 is wider than floor mat 200 and is shown overlapping the edges thereof.

FIG. 3A illustrates a portion of a floor mat with alignment/deployment means. Floor mat 300 is comprised of a textile component 310 rolled back upon itself. Between textile component 310 and base component 350 lies a sheet of material 375 used to aid in aligning and deploying textile component 310 onto base component 350. The sheet of material 375 is located under an upper portion 311 of textile component 310. In this embodiment, the sheet of material 375 is more narrow than that the floor mat and therefore does not overlap the edges of floor mat 300. Note that in FIGS. 2, 3A and 3B, base component 250, 350 is flat (planar) and does not contain a recessed area (or tray); the base component 250, 350 is trayless.

FIG. 3B is the same FIG. 3A, except that entire floor mat is shown and textile component 310 is pulled back to expose sheet material 375.

The sheet of material 275, 375 is comprised of any film or sheeting material that provides masking or blocking properties to the attachment mechanisms incorporated into or onto the textile and/or base component. For example, the sheet of material may be comprised of magnetically receptive sheeting, such as FlexIron™ from Master Magnetics, Inc.; cellulose-containing materials, such as paper; polymer films; and combinations thereof. Thus, this installation method utilizes a removable temporary "mask" that reduces the attractive force between the components comprising the floor mat. This is accomplished by using sheeting, film or paper material that is placed between the base component and the rolled up textile component, but only in the area where the rolled up textile component and the base component contact one another. Now that the total area is greatly reduced by the roll and the force per unit area is reduced by the mask, the ease of moving the roll around to achieve alignment is now even greater. Once alignment is achieved, the masking material is removed by pulling or sliding it out from between the components.

FIG. 4A illustrates a floor mat 400 comprised of textile component 410 aligned and deployed with base component 450. Corner attachment means 412 are provided as an attachment means for attaching textile component 410 to base component 450. As illustrated in FIG. 1A, magnetic coatings may be applied to the textile and base component of FIG. 4A. Thus, corner attachment means 412 may be used in combination with magnetic coatings to adhere the textile component to the base component.

The corner attachment means 412 of FIG. 4A are shown in FIG. 4B in an expanded view. Textile component 410 is pulled back to expose the corner attachment means (e.g. corner grommets). Corner attachment means 412 are comprised of a male portion 416 and a female portion 418. The male portion 416 is intended to fit securely into female portion 418. FIG. 4B illustrates male portion 416 contained within base component 450 and female portion 418 contained within textile portion 410. However, it is understood that the inverse arrangement could also be suitable whereby the location of the male and female portions are reversed. Floor mat 400 provides for attachment means that may be used in combination with or in place of magnetic attraction (e.g. magnetic coatings) for the purpose of adhering the textile component to the base component.

FIG. 4C is the same as FIG. 4A, except that corner areas 413 of textile component 410 are free from face yarns. Corner attachment means 412 are located in corner areas 413 that are free from face yarns. Corner attachment means 412 attach textile component 410 to base component 450.

Details of corner attachment means 412 are illustrated in FIG. 4D. As mentioned previously, corner attachment means 412 is comprised of male portion 416 and female portion 418. Female portion 418 is comprised of a cap portion 418a and a head portion 418b. Cap portion 418a is located on the surface of textile component 410 that contains face yarns. Head portion 418b is located on the surface opposite of cap portion 418a. Head portion 418b is inserted into cap portion 418a through an opening 419 in textile component 410 to form female portion 418. Male portion 416 is inserted upward through an opening 421 in base component 450. After female portion 418 is assembled of its cap portion 418a and head portion 418b, then male portion 416 may be inserted into female portion 418, thereby securing textile component 410 to base component 450.

FIGS. 5A-5C illustrate yet another embodiment of alignment and deployment techniques used in combination with corner attachment means. FIG. 5A shows a properly aligned and deployed multi-component floor mat 500 comprised of textile component 510 and base component 550. Note that no external corner attachment means are visible from the top perspective view. FIG. 5B is an expanded view of floor mat 500 of FIG. 5A with a portion of textile component 510 pulled back to expose sheet material 575. Sheet material 575 is one embodiment of the alignment and deployment mechanism of the present invention and is comprised of material as previously discussed herein. FIG. 5B further illustrates female corner attachment means 516 located in base component 550 and male corner attachment means 518 located in textile portion 510. Both attachment means are useful for aligning textile portion 510 with base component 550. Male corner attachment means 516 is adapted to fit snugly within the circumference of female corner attachment means 518. Female corner attachment means 518 is a hole in base component 550 having a depth that is in the range from 10% to 100% of the height of the base component. Male corner attachment means 516 are peg-like protrusions that fit snugly into the circumference of female corner attachment means 518.

FIG. 5C is similar to FIG. 5B, except that a permanent magnet 518a is inserted into female corner attachment means 518' and male corner attachment means 516' contains a magnetically receptive material. Thus, female corner attachment means 518' and male corner attachment means 516' are magnetically attracted to one another. This differs from that taught in FIG. 5B, wherein, the male and female attachment means are secured together by inserting a peg into a hole. Alternatively, multiple magnets (e.g. magnet pairs) may be used for securing the textile component to the base component. For instance, a line of small, flush magnet pairs may be suitable for securing the textile component to the base component.

In summary, the following alignment and deployment techniques may be used for installing the multi-component floor mat:

In the first case, it has been found that if the top half is rolled up in a fairly tight roll—face in—and then placed down on the base, that the total attraction force is so reduced that an installer can slide the roll enough to be able to get a good alignment with the base using the exposed end of the roll as a guide to align to the base. This method is mainly envisioned for small two part mats. Alignment marks can be put on the base to assist the top alignment.

The second method is to use the first method but coupled with a removable temporary "mask" that reduces the attractive force. This can be accomplished by using film or paper that is placed down on the base between the rolled up top and the base only in the area where the rolled up top will touch. Now that the total area is greatly reduced by the roll AND the force per unit area is reduced by the mask, then the ease of moving the roll around to achieve alignment is now even greater. Once alignment is achieved, the film or paper is slid out.

A third method, that is a refinement of the removable mask method, is to use a mask that is permanently installed and that selectively masks only the most critical area—i.e. the area directly below the roll, and leaves the area near the mat edge alone. For example, if using a magnetic base and iron containing top, one can use a thin magnetically receptive material known as "FlexIron". This material has the ability to significantly reduce the magnetic force while at the same time strongly sticks to the magnetic base and thus will not move; the result is a permanently installed "mask". This mask is sized and positioned so as to only mask the magnetic force directly below the roll, but leaves the edges alone so as to keep the force high where the edges must resist kicking up. One still manually aligns the roll and its edge to the base, but now the alignment is relatively easy and can be done quickly. Additionally, the base component can be selectively magnetized so that a masking section is not magnetized. The perimeter around the masking section, as well as the perimeter that attracts the edge of the top piece, can be selectively magnetized.

A fourth method can be used in concert with any of the above methods or alone. This method relies on an alignment pins or grommets that can capture two or more of the carpet corners. The pins are located in either the base or top and associated with the pins are complementary holes in the top or base. Once inserted, the pins capture the other half of the carpet requiring such that the two halves cannot be separated without substantial force. Once captured, the top mat can be picked up and gently laid down in alignment with the base. If a mat top should become disturbed or misaligned in the field, it is relatively easy to realign by simply picking the top up and laying it back down. If used in concert with 1-3 above, alignment now becomes not only easy, but quick and precise. Furthermore if care is taken to ensure that the masked area is always below the alignment pins and is sufficient size so that if the top is picked up that where it drapes is masked, then alignment/deployment is always easy.

A fifth method is a refinement of number 4 whereby the attachment pins are hidden and not visible from the face of the mat top. Methods to accomplish this are tightly fitting grommets or strong magnets molded into or glued to the back of the top mat, or grommets with strong magnets—all associated with complimentary holes with or without magnets in the base. This method can also be used in association with any of the 1-3 methods.

Another variation includes a line or pattern of magnetic pairs on one end of the textile component that "snap" the textile component and base component together. These pairs can be spaced such that a single alignment is highly favorable over any other attraction. The magnet pairs may be arranged with opposing poles and the different pairs in the line or pattern have alternating spacing to prevent misalignment.

Methods to attach the top to the bottom include snaps, Velcro, barbed pins, flared pins, plastic rivets, spring loaded snaps, and snaps that require a special tool for release to help prevent theft and inadvertent release.

While the Figures illustrate exemplary embodiments of the alignment and deployment methods for installing the multi-component floor mat of the present invention, certain other aspects and features are contemplated to be obvious variations of the invention described herein. For instance, two or four corner attachment means may be present in the floor mat as used for attaching the textile component to the base component. Further, any combination of alignment and deployment techniques may be used either singularly or combined with others. For example, the method of reducing the surface area of the textile component by rolling it up may be used in combination with the masking technique wherein a sheet of material is placed between the textile and base components to reduce the forces of attraction between the components.

The textile component and the base component may be attached to one another by magnetic attraction. As shown in FIGS. 6A and 6B, the textile component 100' may further comprises a magnetic coating layer 110' as the attachment mechanism for securing the textile component to the base component. Face yarns 115' and primary backing layer 117' comprise a tufted pile carpet 125'. The magnetic coating layer 110' is present on the surface of the textile component 100' that is opposite face yarns 115'. Application of magnetic coating layer 110' to the tufted pile carpet 125' will be described in greater detail below. The resulting textile component 100' is wash durable and exhibits sufficient tuft lock for normal end-use applications.

With respect to the base component, FIG. 7A illustrates one embodiment of the base component. Referring to FIG. 7A, base component 200' contains recessed area 260' surrounded by border 270'. Border 270' slopes gradually upward from outer perimeter 280' to inner perimeter 290', to create recess 210' within base 200', corresponding to the recessed area of 260'. FIG. 7A illustrates that the recessed area 260' of base component 200' possesses a certain amount of depth, thereby defining it as "recessed." The depth of recessed area 260' is illustrated by 210'.

The base component is a planar-shaped tray, which is sized to accommodate the textile component. The base component may also include a border surrounding the tray, whereby the border provides greater dimensional stability to the tray, for example, because the border is thicker, i.e. greater in height relative to the floor. Additionally, the border may be angled upward from its outer perimeter towards the interior of the base component, so as to provide a recessed area where the tray is located, thereby creating a substantially level area between the inner perimeter of the border and the textile component, when the textile component overlays the tray. Additionally, the gradual incline from the outer perimeter of the border to the inner perimeter of the border minimizes tripping hazards and the recess created thereby protects the edges of the textile component.

It can be understood that the base component may be subdivided into two or more recessed trays, by extending a divider from one side of the border to an opposite side of the border, substantially at the height of the inner perimeter. Accordingly, it would be possible to overlay two or more textile components in the recesses created in the base component.

The base component, including the border, may be formed in a single molding process as a unitary article. Alternatively, the border and the tray may be molded separately and then bonded together in a second operation. The tray and border may be made of the same or different materials. Examples of suitable compositions for forming the border and the tray are elastomers, such as natural and synthetic rubber materials, thermoplastic and thermoset resins and metal. The rubber material may be selected from the group consisting of nitrile rubber, including dense nitrile rubber, foam nitrile rubber, and mixtures thereof; polyvinyl chloride rubber; ethylene propylene diene monomer (EPDM) rubber; vinyl rubber; thermoplastic elastomer; and mixtures thereof. In one aspect, the base component is typically comprised of at least one rubber material. The rubber material may contain from 0% to 49% of a recycled rubber material.

In one aspect, the base component may be formed into a tray shape according to the following procedure. Rubber strips are placed overlapping the edges of a metal plate. The metal plate is to be placed on top of a sheet rubber and covered on all 4 sides by strip rubber. As the mat is pressed, it will bond the sheet rubber to the strips. This process may be completed, for example, at a temperature of 370° F. and a pressure of 36 psi. However, depending upon the rubber materials selected, the temperature may be in the range from 200° F. to 500° F. and the pressure may be in the range from 10 psi to 80 psi. Using the recommend settings, the mat may be completely cured in 2 to 8 minutes. After the rubber strips are bound to the rubber sheet, the metal plate is removed leaving a void (i.e. a recessed area in the base component) in which to place the textile component. The textile component has the ability to be inserted and removed from the base component multiple times.

As seen in FIG. 7B, floor mat 1 is present in an arrangement wherein textile component 100' overlays recessed area 260' of base component 200'. A corner of textile component 100' is turned back to further illustrate how the two components fit together within border 270'.

As previously discussed herein, the base component of the floor mat may be in the form a tray. However, in one alternative embodiment, the base component of the floor mat may be flat and have no recessed area (i.e. the base component is trayless). A flat base component is manufactured from a sheet of material, such as a rubber material, that has been cut in the desired shape and vulcanized.

FIG. 7C illustrates a multi-component floor mat 1' wherein textile component 100' is combined with base component 200' that is flat and has no recessed area (i.e. trayless). FIG. 7D shows the multi-component floor mat 1' wherein both textile component 100' and base component 200" are assembled together.

FIGS. 8A and 8B illustrate one embodiment of the back surface of the base component. The back surface of the base component is the surface which lies on the floor and therefore has direct contact with the surface of the floor. Various patterns and/or protrusions on the back surface of the base component may be present so as to facilitate the base component's adherence to the floor. As illustrated in FIGS. 8A and 8B, protrusions 360' may be present on the back surface of base component 300'. The protrusions 360' may be present in a repeating pattern such that a three dimensional array of protrusions is formed having a uniform pattern.

It is further contemplated to be within the scope of the present invention that the base component of the multi-component floor mat is comprised of any substance that includes a magnetic material. The base component does not have to be comprised of vulcanized rubber. Instead, the base component may be comprised of concrete, cellulose-containing materials (e.g. wood), metal, thermoplastic materials, thermoset materials, and the like, and combinations thereof. In one instance, the base component may be the floor itself where the textile component is to be installed. Herein, the floor would include at least one magnetic material that is used to adhere the textile component to the floor. The textile component can then be laid directly on the floor which has at least one magnetic material applied thereto. Suitable magnetic materials include any of those described previously herein. In one aspect, the magnetic materials may be incorporated into a paint composition and applied to the floor. Or, an electromagnetic force may be applied to the area where the textile component is to be installed. Any of these magnetic features will provide the necessary adherence of the textile component to the floor without the need for a vulcanized rubber base component.

Floor mats of the present invention may be of any geometric shape or size as desired for its end-use application. The longitudinal edges of the floor mats may be of the same length and width, thus forming a square shape. Or, the longitudinal edges of the floor mats may have different dimensions such that the width and the length are not the same. Alternatively, the floor mats may be circular, hexagonal, and the like. As one non-limiting example, floor mats of the present invention may be manufactured into any of the current industry standards sizes that include 2 feet by 4 feet, 3 feet by 4 feet, 3 feet by 5 feet, 4 feet by 6 feet, 3 feet by 10 feet, and the like.

Magnetic attraction is achieved via application of a magnetic coating to the textile component and/or base component or via incorporation of magnetic particles in a rubber-containing layer prior to vulcanization. Alternatively, magnetic attraction can be achieved using both methods such that a magnetic coating is applied to the textile component and magnetic particles are included in the vulcanized rubber of the base component. The inverse arrangement is also contemplated.

The magnetic coating may be applied to the textile component and/or the base component by several different manufacturing techniques. Exemplary coating techniques include, without limitation, knife coating, pad coating, paint coating, spray application, roll-on-roll methods, troweling methods, extrusion coating, foam coating, pattern coating, print coating, lamination, and mixtures thereof.

FIG. 9 illustrates one embodiment of the manufacturing process of the textile component of the present invention. The uncoated tufted pile carpet 425' is fed to laminating belt 410'. The belt moves through the coating zone to lamination zone of the lamination press. A magnetic coating 420' is fed transversely to laminating belt 410'. As magnetic coating 420' is fed to laminating belt 410', it passes under coating knife 430'. The coating knife 430' is adjusted so that the desired coating thickness is achieved. For example, a magnetic coating thickness of 25 mil may be desirable. After magnetic coating 420' passes under coating knife 430', it comes into contact with tufted pile carpet 425'. The magnetic coating 420' and tufted pile carpet 425' then move transversely to laminating press 440'. Laminating press 440' is located above laminating belt 410'. The laminating press 440' is lowered onto laminating belt 410', pressing tufted pile carpet 425' and magnetic coating 420' together. The laminating press 440' is heated and therefore provides both heat and pressure to the lamination process. Providing heat at this point of the lamination process further serves to cure any materials (e.g. binder materials) that may be contained within the magnetic coating. After a predetermined amount of time, laminating press 440' is lifted from laminating belt 410'. The magnetic coating 420' is now laminated to tufted pile carpet 425' to form textile component 450'. In one aspect, the laminating press may be operated at a temperature in the range from 200° F. to 500° F. and at a pressure in the range from 10 psi to 50 psi, or even at 300° F. and a pressure of 36 psi.

In instances wherein magnetic attraction is achieved by incorporating magnetic particles in a rubber-containing layer, the following procedure may be utilized: (a) an unvulcanized rubber-containing material is provided (such as nitrile, SBR, or EPDM rubber), (b) magnetic particles are added to the unvulcanized rubber, (c) the particles are mixed with the rubber, and (d) the mixture of step "c" is formed into a sheet and attached to the bottom of the textile component and/or represents the base component. Mixing in step "c" may be achieved via a rubber mixing mill.

FIG. 10 is provided in order to illustrate some of the terms used herein with respect to various types of magnets and magnetization properties. In this application, magnetizable is defined to mean the particles present in the coating or vulcanized rubber layer are permanently magnetized or can be magnetized permanently using external magnets or electromagnets. Once the particles are magnetized, they will keep their magnetic response permanently. The magnetizable behavior for generating permanent magnetism falls broadly under ferromagnets and ferrimagnets. Barium ferrites, strontium ferrites, neodymium and other rare earth metal based alloys are non-limiting examples of materials that can be applied in the magnetic coatings and/or vulcanized rubber layer.

As used herein, magnetically responsive is defined to mean the particles present in the coating and/or vulcanized rubber layer are only magnetically responsive in the presence of external magnets. The component that contains the magnetic particles is exposed to a magnetic field which aligns the dipoles of magnetic particles. Once the magnetic field is removed from the vicinity, the particles will become non-magnetic and the dipoles are no longer aligned. The magnetically responsive behavior or responsive magnetic behavior falls broadly under paramagnets or superparamagnets (particle size less than 50 nm).

This feature of materials being reversibly magnetic is shown in FIG. 10 whereby the dipoles of the superparamagnetic or paramagnetic materials are not aligned, but upon exposure to a magnet, the dipoles line up and point in the same direction thereby allowing the materials to exhibit magnetic properties. Non-limiting examples of materials exhibiting these features include iron oxide, steel, iron, nickel, aluminum, or alloys of any of the foregoing.

Further examples of magnetizable magnetic particles include $BaFe_3O_4$, $SrFe_3O_4$, NdFeB, AlNiCo, CoSm and other rare earth metal based alloys, and mixtures thereof. Examples of magnetically responsive particles include $Fe_2O_3$, $Fe_3O_4$, steel, iron particles, and mixtures thereof. The magnetically receptive particles may be paramagnetic or superparamagnetic. The magnet particles are typically characterized as being non-degradable.

In one aspect of the invention, particle size of the magnetically receptive particles is in the range from 1 micron to 10 microns. Particle size of the magnetically receptive particles may be in the range from 10 nm to 50 nm for superparamagnetic materials. Particle size of the magnetically receptive particles is typically greater than 100 nm for paramagnetic and/or ferromagnetic materials.

Magnetic attraction is typically exhibited at any loading of the above magnetic materials. However, the magnetic attraction increases as the loading of magnetic material increases. In one aspect of the invention, the magnetic field strength of the textile component to the base component is greater than 50 gauss, more preferably greater than 100 gauss, more preferably greater than 150 gauss, or even more preferably greater than 200 gauss.

In one aspect, the magnetic material is present in the coating composition in the range from 25% to 95% by weight of the coating composition. In another aspect, magnetic particle loading may be present in the magnetic coating applied to the textile component in the range from 10% to 70% by weight of the textile component. The magnetic particle loading may be present in the magnetic coating applied to the base component in the range from 10% to 90% by weight of the base component.

The magnetically receptive particles may be present in the vulcanized rubber layer of the textile component in a substantially uniform distribution. In another aspect of the present invention, it is contemplated that the magnetically receptive particles are present in the rubber layer of the textile component in a substantially non-uniform distribution. One example of a non-uniform distribution includes a functionally graded particle distribution wherein the concentration of particles is reduced at the surface of the textile component intended for attachment to the base component. Alternatively, another example of a non-uniform distribution includes a functionally graded particle distribution wherein the concentration of particles is increased at the surface of the textile component intended for attachment to the base component.

The magnetic attraction between the textile component and the base component may be altered by manipulation of the surface area of one or both of the textile and/or base components. The surfaces of one or both of the components may be textured in such a way that surface area of the component is increased. Such manipulation may allow for customization of magnetic attraction that is not directly affected by the amount of magnetic particles present in the floor mat.

For instance, a substantially smooth (less surface area) bottom surface of the textile component will generally result in greater magnetic attraction to the top surface of the base component. In contrast, a less smooth (more surface area) bottom surface of the textile component (e.g. one having ripples or any other textured surface) will generally result in less magnetic attraction to the top surface of the base component. Of course, a reverse arrangement is also contemplated wherein the base component contains a textured surface. Furthermore, both component surfaces may be textured in such a way that magnetic attraction is manipulated to suit the end-use application of the inventive floor mat.

As discussed previously, the magnetic particles may be incorporated into the floor mat of the present invention either by applying a magnetic coating to surface of the textile component or by including the particles in the rubber material of the textile material and/or the base component prior to vulcanization. When incorporation is via a magnetic coating, a binder material is generally included. Thus, the magnetic coating is typically comprised of at least one type of magnetic particles and at least one binder material.

The binder material is typically selected from a thermoplastic elastomer material and/or a thermoplastic vulcanite material. Examples include urethane-containing materials, acrylate-containing materials, silicone-containing materials, and mixtures thereof. Barium ferrites, strontium ferrites, neodymium and other rare earth metal based alloys can be mixed with the appropriate binder to be coated on the textile and/or base component.

In one aspect, the binder material will exhibit at least one of the following properties: (a) a glass transition ($T_g$) temperature of less than 10° C.; (b) a Shore A hardness in the range from 30 to 90; and (c) a softening temperature of greater than 70° C.

In one aspect, an acrylate and/or urethane-containing binder system is combined with $Fe_3O_4$ to form the magnetic coating of the present invention. The ratio of $Fe_3O_4$:acrylate and/or urethane binder is in the range from 40-70%:60:30% by weight. The thickness of the magnetic coating may be in the range from 10 mil to 40 mil. Such a magnetic coating exhibits flexibility without any cracking issues.

Following application or inclusion of the magnetic particles into the textile and/or base component, the particles need to be magnetized. Magnetization can occur either during the curing process or after the curing process. Curing is typically needed for the binder material that is selected and/or for the rubber material that may be selected.

During the curing process, the magnetizable particles are mixed with the appropriate binder and applied via a coating technique on the substrate to be magnetized. Once the coating is complete, the particles are magnetized in the presence of external magnets during the curing process. The component that contains the magnetic particles is exposed to a magnetic field which aligns the dipoles of magnetic particles, locking them in place until the binder is cured. The magnetic field is preferably installed in-line as part of the manufacturing process. However, the magnetic field may exist as a separate entity from the rest of the manufacturing equipment.

Alternatively, the magnetic particles may be magnetized after the curing process. In this instance, the magnetizable particles are added to the binder material and applied to the textile and/or base component in the form of a film or coating. The film or coating is then cured. The cured substrate is then exposed to at least one permanent magnet. Exposure to the permanent magnet may be done via direct contact with the coated substrate or via indirect contact with the coated substrate. Direct contact with the permanent magnet may occur, for example, by rolling the permanent magnet over the coated substrate. The magnet may be rolled over the coated substrate a single time or it may be rolled multiple times (e.g. 10 times). The permanent magnet may be provided in-line with the manufacturing process, or it may exist separately from the manufacturing equipment. Indirect contact may include a situation wherein the coated substrate is brought close to the permanent magnet, but does not contact or touch the magnet.

Depending upon the pole size, strength and domains on the permanent magnet (or electromagnet), it can magnetize the magnetizable coating to a value between 10 and 5000 gauss or a value close to the maximum gauss value of the magnetizing medium. Once the coating is magnetized, it will typically remain permanently magnetized.

Mechanical fasteners such as mushroom-shaped protrusions are described in commonly owned U.S. Provisional Application No. 62/033,233 (the '233 Application) filed on Aug. 5, 2014, which is entirely incorporated by reference herein. The '233 Application teaches a two part floor covering wherein a mat is placed on a base, overlaying a tray, to create the floor covering. Herein, it is further described:

The mat can be readily removed for laundering or disposal and replaced with another mat, as desired. Various features are provided to improve the operation of the floor covering, especially with regard to inhibiting relative movement between the mat and the base when the floor covering is deployed on a floor, both with regard to horizontal movement (lateral shifting) and vertical movement (lifting). An advantage of this invention is that the features employed to inhibit relative movement between the mat and base when the floor covering is in use do not interfere with mat replacement, which requires that the mat be readily shifted laterally and, as necessary, lifted, to position the mat relative to the base and remove wrinkles in the mat prior to deployment.

The mat may be temporarily affixed to the base by a mushroom-type fastener system. The system includes a mushroom-type hook strip characterized by a backing, an array of upstanding stems distributed across the face of the backing, with each of the stems having a mushroom head. The mushroom-type hook strips are typically provided as an integrally molded unit. A first mushroom-type hook strip can engage a second mushroom-type hook strip that is configured to interlock with the first strip to create a fastener system, with the first and second strips attached to the mat and base, respectively.

Alternatively, the mushroom-type hook fastener may engage a loop strip or the mushroom-type hook fastener can be directly fastened to a fabric that can be penetrated by the hooks. It can be understood that the mushroom-type hook fastener may be attached to the base and the loop fabric or the fabric cable of being penetrated by the mushroom-type hooks may be attached to the backing layer of the mat, or vice versa. In one embodiment, the mushroom-type hook fastener is attached to the base and the backing layer of the mat is a fabric capable of being penetrated by the hooks, such as a scrim or non-woven fabric.

It is not necessary for the entire surface of the mat and tray to be covered with the mushroom-type hook fastener system. Rather, for economy of manufacture and to balance the requirements of stabilizing the mat without making it overly difficult to separate the mat from the base for servicing, the mushroom-type hook fastener system may be spaced apart in discrete areas, for example spaced around the edges of the mat.

Examples of suitable mushroom-type hook fastener systems may be found in the following references: U.S. Pat. Nos. 4,454,183; 5,077,870; 5,607,635; 5,845,735; 7,188,396 B2; and US Published Patent Application No. 2014/0137377 A1. Commercial products include Microplast® and Duotec® fasteners, available from Gottlieb Binder GmbH & Co. KG, Dual Lock™ fasteners from 3M.

In the foregoing embodiment, the method of replacing a mat is a two-step process. The mat is first positioned to overlay the tray, within the border of the base. The relatively lightweight mat does not immediately engage the mushroom-type fastener system, which allows the mat to be moved laterally relative to the base by lateral movement, without the need to disengage the fasteners. Once the mat is properly positioned, an operator need only press down on the mushroom-type fastener system, for example, along the perimeter of the mat, to engage the fastener and inhibit relative movement between the mat and base. When the mat is to be replaced, an operator can simply peal back the mat, by lifting an edge.

Referring to FIGS. 11 and 12, mat 11 overlays tray 12 of base 13. A corner of mat 11 is turned back to reveal mushroom-type fasteners 14 attached in discrete strips along the underside edge of mat 11 and mushroom-type fasteners 15 attached in discrete strips along tray 12, within border 16 of base 13. Mushroom-type fasteners 14 and 15 are arranged opposite each other and interlock to inhibit lateral and lifting movement of mat 11 relative to base 13. The mushroom-type fasteners may be attached to the mat and base by various methods known in the art, for example with an adhesive or by mechanical attachment, such as a rivet or high tenacity thread.

The relative lateral movement between the mat and the base may be inhibited by incorporating one or more of the following techniques to provide a high coefficient of friction between the backing layer and the tray. The techniques to increase the coefficient of friction between the mat and the base may be used alone or in conjunction with the mushroom-type fastening system described herein. Furthermore, where it is feasible, two or more of the techniques to increase the coefficient of friction between the mat and the base may be employed.

1. Textured Surface(s).

The surface of the backing layer, i.e. the underside, or the upper surface of the tray, or both can be textured. Broadly, the term texturing is intended to include any physical modification of the surface texture of a component to increase the coefficient of friction between the two surfaces. Of particular interest is texturing a surface to increase its roughness. In one embodiment, the backing layer or tray may be textured by calendaring against an embossed roll. Alternatively, the textured surface may be created by a clam press having an embossed surface.

In one embodiment, the surface of the backing layer, tray or both may be textured to create a granular surface. By way of example, a granular surface having a surface roughness of from 10 to 50 microns, as measured between the low and high points along the textured area, may be created to increase the coefficient of friction.

2. Complimentary Surfaces.

Of particular utility is to provide the surfaces of both the backing layer and the tray with complimentary surface structures, such that raised areas and valleys of the respective surfaces fit together. In one embodiment of the invention, the contact surface area between the mat and the tray is greater than the area covered by the mat itself, for example, because the mat and tray mesh together. The scale of the complimentary surfaces may be adjusted so that the force required to adjust the mat laterally relative to the tray is minimal, when a replacement mat is installed. In that regard, it is believed that the differences in height between raised areas and valley ranging from 10 to 50 microns are particularly useful in the present invention.

3. Surface Projections.

The coefficient of friction between the backing layer and the tray may be increased by providing one or both of the surfaces with projections. The projections may be rounded, such as nubs, or pointed, such as spikes. By way of example, the surface projections may extend from the surface of the backing layer or tray a distance of from 10 to 50 microns.

Referring to FIGS. 13 and 14, mat 17 is shown on base 18, overlaying tray 19 within border 20. A corner of mat 17 is lifted to show nubs 21 projecting from backing layer 22. Tray 20 is provided with nubs 23 projecting from its upper surface. Referring to FIG. 14, nub 23 projects a distance "d" from the surface of tray 20.

4. Increase Surface Tack.

The coefficient of friction between the backing layer and the tray may be increased by providing one or both of the surfaces with a layer of tacky material. For example, the tacky material may be a hot-melt thermoplastic material, such as a polyolefin based elastomer, in particular, a propylene, ethylene or ethylene-vinyl acetate based elastomer. The tacky material may be a pressure sensitive adhesive, such as a double-side film.

Other mechanical fasteners useful for attaching the textile component to the base component include grommets, Velcro®, barbed pins, flared pins plastic rivets, spring loaded snaps, snaps that require special tools to release them to aid in the prevention of theft and inadvertent release, and the like, and combinations thereof.

Adhesive attraction includes cohesive materials such as cohesive glue, pressure seal glue, or cold seal glue that use cohesion force to facilitate adhesion between two materials. These types of adhesives are those known to generally stick only to themselves or to certain designated surfaces. Although not completely understood, it is believed that the mechanism of cohesive force is derived from the polycrystalline domain and strain induced crystallization characteristic of these materials. It is also believed that polymer chain entanglement occurs at the interface where two or more coated substrates contact one another, therefore contributing to the cohesive force. In order to use cohesive materials, typically both surfaces being adhered together contain some amount of the cohesive material.

Exemplary cohesive materials include natural rubber, such as natural rubber latex-based materials. One commercially available nature rubber latex is 8221 from Cattie Adhesive of Quakertown, PA Other suitable materials include polymer or polymer compounds having the following characteristics: (a) they are physically or chemically crosslinked; (b) they contain flexible polymer chains in an amorphous state which can partially infuse into the other cohesive component surface and entangle with the other chains, and/or (c) they have free chain ends to help form an entanglement network. In this regard, styrene-isoprene-styrene elastomer (such as Kraton D1161) or styrene-butadiene-styrene elastomer (such as Kraton D1102) may be a suitable cohesive material. Preferably, these materials contain a high diblock content. Other suitable polymers include polyolefin copolymer elastomer (such as Vistamaxx 6202 from Exxon or Dow Engage from Dow), polyester copolymer elastomer (such as Riteflex 425 from Celanese), and cis-polyisoprene elastomer. Of course, any of the aforementioned cohesive materials may be combined with one another for application to at least one of the textile or base components of the floor mat.

Thus, in one aspect, the floor mat is comprised of a textile component having face yarns tufted through a primary backing layer and a base component comprised of rubber or other elastomeric material. The textile component and the base component are coated with a cohesive material on the surfaces of the components that come into contact with one another (i.e. the bottom surface of the textile component and the top surface of the base component). The cohesive material applied to the components may be the same for each component or it may be different. The cohesive material may be applied to the components by any suitable method, including heat lamination, extrusion coating, injection molding, foam coating, kiss coating, and the like, and combinations thereof.

Any combination of mechanical fasteners, adhesives, and magnetic forces may be useful for attaching the textile component to the base component and forming the multi-component floor mat of the present invention.

The base component of the floor mat may be partially or wholly covered with a textile component. Typically, the textile component will be lighter in weight than the base component. Inversely, the base component will weigh more than the textile component.

With respect to the textile component itself, the textile component may be comprised of tufted pile carpet. The tufted pile carpet is comprised of a primary backing layer and face yarns. The primary backing layer is typically included in the tufted pile carpet to give stability to the face yarns. The materials comprising the face yarns and the primary backing layer may independently be selected from synthetic fiber, natural fiber, man-made fiber using natural constituents, inorganic fiber, glass fiber, and a blend of any of the foregoing. By way of example only, synthetic fibers may include polyester, acrylic, polyamide, polyolefin, polyaramid, polyurethane, or blends thereof. More specifically, polyester may include polyethylene terephthalate, polytrimethylene terephthalate, polybutylene terephthalate, polylactic acid, or combinations thereof. Polyamide may include nylon 6, nylon 6,6, or combinations thereof. Polyolefin may include polypropylene, polyethylene, or combinations thereof. Polyaramid may include poly-p-phenyleneteraphthalamide (i.e., Kevlar®), poly-m-phenyleneteraphthalamide (i.e., Nomex®), or combinations thereof. Exemplary natural fibers include wool, cotton, linen, ramie, jute, flax, silk, hemp, or blends thereof. Exemplary man-made materials using natural constituents include regenerated cellulose (i.e., rayon), lyocell, or blends thereof.

The material comprising the face yarns and primary backing layer may be formed from staple fiber, filament fiber, slit film fiber, or combinations thereof. The fiber may be exposed to one or more texturing processes. The fiber may then be spun or otherwise combined into yarns, for example, by ring spinning, open-end spinning, air jet spinning, vortex spinning, or combinations thereof. Accordingly, the material comprising the face yarns will generally be comprised of interlaced fibers, interlaced yarns, loops, or combinations thereof.

The material comprising the face yarns and the primary backing layer may be comprised of fibers or yarns of any size, including microdenier fibers or yarns (fibers or yarns having less than one denier per filament). The fibers or yarns may have deniers that range from less than about 0.1 denier per filament to about 2000 denier per filament or, more preferably, from less than about 1 denier per filament to about 500 denier per filament.

Furthermore, the material comprising the face yarns and the primary backing layer may be partially or wholly comprised of multi-component or bi-component fibers or yarns in various configurations such as, for example, islands-in-the-sea, core and sheath, side-by-side, or pie configurations. Depending on the configuration of the bi-component or multi-component fibers or yarns, the fibers or yarns may be splittable along their length by chemical or mechanical action.

Additionally, the face yarns and the primary backing layer may include additives coextruded therein, may be precoated with any number of different materials, including those listed in greater detail below, and/or may be dyed or colored to provide other aesthetic features for the end user with any type of colorant, such as, for example, poly(oxyalkylenated) colorants, as well as pigments, dyes, tints, and the like. Other additives may also be present on and/or within the target fiber or yarn, including antistatic agents, brightening compounds, nucleating agents, antioxidants, UV stabilizers, fillers, permanent press finishes, softeners, lubricants, curing accelerators, and the like.

The face yarns may be dyed or undyed. If the face yarns are dyed, they may be solution dyed. The weight of the face yarn, pile height, and density will vary depending on the desired aesthetics and performance requirements of the end-use for the floor mat. The face yarns may be of loop pile construction, cut pile construction, or combinations of loop pile and cut pile.

The primary backing layer can be any suitable primary backing material. The primary backing layer may be comprised of a woven, nonwoven or knitted material, or combinations thereof. The general purpose of the primary backing layer is to support the tufts of the face yarns. In one aspect, the primary backing layer is a nonwoven polyester spunbond material. One commercially available example of the polyester spunbond material is Lutradur® from Freudenberg Nonwovens of Weinheim, Germany. In another aspect, flat woven polyester tapes, such as Isis™ from Propex of Chattanooga, TN, may be utilized. Also, Colback® nonwoven backing material may also be suitable for use. If needed, a primary backing layer made of a woven tape with either staple fibers or nonwoven fabrics affixed can be used. Also, stitch bonded and knitted polyester fabrics may be used.

The tufted pile carpet that includes face yarns tufted into a primary backing layer may be heat stabilized to prevent dimensional changes from occurring in the finished mat. The heat stabilizing or heat setting process typically involves applying heat to the material that is above the glass transition temperature, but below the melting temperature of the components. The heat allows the polymer components to release internal tensions and allows improvement in the internal structural order of the polymer chains. The heat stabilizing process can be carried out under tension or in a relaxed state. The tufted pile carpet is sometimes also stabilized to allow for the yarn and primary backing to shrink prior to the mat manufacturing process.

In one aspect of the present invention, the tufted pile carpet is comprised of yarn tufted into fabric, which is then injection or fluid dyed, and then bonded with a rubber layer or washable latex backing. The carpet yarn may be selected from nylon 6; nylon 6,6; polyester; and polypropylene fiber. The yarn is tufted into a woven or nonwoven substrate. The yarn can be of any pile height and weight necessary to support printing. The tufted pile carpet may be printed using any print process. In one aspect, injection dyeing may be utilized to print the tufted pile carpet.

Printing inks will contain at least one dye. Dyes may be selected from acid dyes, direct dyes, reactive dyes, cationic dyes, disperse dyes, and mixtures thereof. Acid dyes include azo, anthraquinone, triphenyl methane and xanthine types. Direct dyes include azo, stilbene, thiazole, dioxsazine and phthalocyanine types. Reactive dyes include azo, anthraquinone and phthalocyanine types. Cationic dyes include thiazole, methane, cyanine, quinolone, xanthene, azine, and triaryl methine. Disperse dyes include azo, anthraquinone, nitrodiphenylamine, naphthal imide, naphthoquinone imide and methane, triarylmethine and quinoline types.

As is known in the textile printing art, specific dye selection depends upon the type of fiber and/or fibers comprising the washable textile component that is being printed. For example, in general, a disperse dye may be used to print polyester fibers. Alternatively, for materials made from cationic dyeable polyester fiber, cationic dyes may be used.

The printing process of the present invention uses a jet dyeing machine, or a digital printing machine, to place printing ink on the surface of the mat in predetermined locations. One suitable and commercially available digital printing machine is the Millitron® digital printing machine, available from Milliken & Company of Spartanburg, South Carolina. The Millitron® machine uses an array of jets with continuous streams of dye liquor that can be deflected by a controlled air jet. The array of jets, or gun bars, is typically stationary. Another suitable and commercially available digital printing machine is the Chromojet® carpet printing machine, available from Zimmer Machinery Corporation of Spartanburg, South Carolina. In one aspect, a tufted carpet made according to the processes disclosed in U.S. Pat. Nos. 7,678,159 and 7,846,214, both to Weiner, may be printed with a jet dyeing apparatus as described and exemplified herein.

Viscosity modifiers may be included in the printing ink compositions. Suitable viscosity modifiers that may be utilized include known natural water-soluble polymers such as polysaccharides, such as starch substances derived from corn and wheat, gum arabic, locust bean gum, tragacanth gum, guar gum, guar flour, polygalactomannan gum, xanthan, alginates, and a tamarind seed; protein substances such as gelatin and casein; tannin substances; and lignin substances. Examples of the water-soluble polymer further include synthetic polymers such as known polyvinyl alcohol compounds and polyethylene oxide compounds. Mixtures of the aforementioned viscosity modifiers may also be used. The polymer viscosity is measured at elevated temperatures when the polymer is in the molten state. For example, viscosity may be measured in units of centipoise at elevated temperatures, using a Brookfield Thermosel unit from Brookfield Engineering Laboratories of Middleboro, MA Alternatively, polymer viscosity may be measured by using a parallel plate rheometer, such as made by Haake from Rheology Services of Victoria Australia.

After printing, the tufted pile carpet may be vulcanized with a rubber backing. The thickness of the rubber will be such that the height of the finished textile component will be substantially the same height as the surrounding base component when the base component is provided in a tray configuration. Once vulcanized, the textile component may be pre-shrunk by washing.

After the textile component has been made, it will be custom cut to fit into the recessed area of the base component (for instances in which the base component is in the form of a tray) or onto the base component (for instances wherein the base component is substantially flat/trayless/without recessed area). The textile component may be cut using a computer controlled cutting device, such as a Gerber machine. It may also be cut using a mechanical dye cutter, hot knife, straight blade, or rotary blade. In one aspect of the invention, the thickness of the textile component will be substantially the same as the depth of the recessed area when the base component is in the form of a tray.

The washable floor mat of the present invention may be exposed to post treatment steps. For example, chemical treatments such as stain release, stain block, antimicrobial resistance, bleach resistance, and the like, may be added to the washable mat. Mechanical post treatments may include cutting, shearing, and/or napping the surface of the washable multi-component floor mat.

The performance requirements for commercial matting include a mixture of well documented standards and industry known tests. Tuft Bind of Pile Yarn Floor Coverings (ASTM D1335) is performance test referenced by several organizations (e.g. General Services Administration). Achieving tuft bind values greater than 4 pounds is desirable, and greater than 5 pounds even more desirable.

Resistance to Delamination of the Secondary Backing of Pile Yarn Floor Covering (ASTM D3936) is another standard test. Achieving Resistance to Delamination values greater than 2 pounds is desirable, and greater than 2.5 pounds even more desirable.

Pilling and fuzzing resistance for loop pile (ITTS112) is a performance test known to the industry and those practiced in the art. The pilling and fuzzing resistance test is typically a predictor of how quickly the carpet will pill, fuzz and prematurely age over time. The test uses a small roller covered with the hook part of a hook and loop fastener. The hook material is Hook 88 from Velcro of Manchester, NH and the roller weight is 2 pounds. The hook-covered wheel is rolled back and forth on the tufted carpet face with no additional pressure. The carpet is graded against a scale of 1 to 5. A rating of 5 represents no change or new carpet appearance. A rating of less than 3 typically represents unacceptable wear performance.

An additional performance/wear test includes the Hexapod drum tester (ASTM D-5252 or ISO/TR 10361 Hexapod Tumbler). This test is meant to simulate repeated foot traffic over time. It has been correlated that a 12,000 cycle count is equivalent to ten years of normal use. The test is rated on a gray scale of 1 to 5, with a rating after 12,000 cycles of 2.5=moderate, 3.0=heavy, and 3.5=severe. Yet another performance/wear test includes the Radiant Panel Test. Some commercial tiles struggle to achieve a Class I rating, as measured by ASTM E 648-06 (average critical radiant flux >0.45=class I highest rating).

The textile component of the floor mat may be washed or laundered in an industrial, commercial or residential washing machine. Achieving 200 commercial washes on the textile component with no structural failure is preferred.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. A multi-component floor mat comprising:
   (a) A textile component comprising (i) tufted pile carpet wherein face yarns are tufted through a primary backing layer, and wherein the tufted pile carpet contains printing ink and (ii) a magnetic coating wherein the magnetic coating is comprised of magnetic particles and a binder material;
   (b) A base component comprising an elastomer that contains magnetic particles; wherein the textile component and the base component are releasably attachable to one another via magnetic attraction; and
   (c) A magnetically receptive sheeting material, wherein the magnetically receptive sheeting material is positioned between the textile and base components and is smaller in size than the textile and base components thereby covering only a portion of the surface of said components.

2. The multi-component floor mat of claim 1, wherein the binder material is selected from a thermoplastic elastomer material, a thermoplastic vulcanite material, and mixtures thereof.

3. The multi-component floor mat of claim 2, wherein the binder material is selected from the group consisting of urethane-containing materials, acrylate-containing materials, silicone-containing materials, and mixtures thereof.

4. The multi-component floor mat of claim 1, wherein the magnetic coating is applied to the textile component via knife coating, pad coating, paint coating, spray application, roll-on-roll methods, troweling methods, extrusion coating, foam coating, pattern coating, print coating, lamination, and mixtures thereof.

* * * * *